US012786707B2

(12) United States Patent
Xu et al.

(10) Patent No.: US 12,786,707 B2
(45) Date of Patent: Nov. 3, 2026

(54) COMMUNICATION METHOD AND COMMUNICATION APPARATUS

(71) Applicant: Huawei Technologies Co., Ltd., Shenzhen (CN)

(72) Inventors: Yishan Xu, Shanghai (CN); Hualin Zhu, Shanghai (CN); Haoren Zhu, Shanghai (CN); Li Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 18/506,304

(22) Filed: Nov. 10, 2023

(65) Prior Publication Data

US 2024/0080665 A1 Mar. 7, 2024

Related U.S. Application Data

(63) Continuation of application No. PCT/CN2022/092229, filed on May 11, 2022.

(30) Foreign Application Priority Data

May 12, 2021 (CN) ......................... 202110519706.9

(51) Int. Cl.
*H04W 12/06* (2021.01)

(52) U.S. Cl.
CPC .................................... *H04W 12/06* (2013.01)

(58) Field of Classification Search
CPC ............... H04W 12/06; H04W 12/068; H04W 12/35; H04W 12/72; H04W 60/00; H04W 60/04;

(Continued)

(56) References Cited

U.S. PATENT DOCUMENTS

2018/0317086 A1* 11/2018 Ben Henda ......... H04W 12/062
2019/0007830 A1* 1/2019 Ben Henda ......... H04L 63/0892

(Continued)

OTHER PUBLICATIONS

3GPP TS 23.501 V17.0.0 (Mar. 2021),3rd Generation Partnership Project;Technical Specification Group Services and System Aspects-;System architecture for the 5G System (5GS);Stage 2 (Release 17),total 482 pages.

(Continued)

*Primary Examiner* — Yuwen Pan
*Assistant Examiner* — Samuel H. Leonard
(74) *Attorney, Agent, or Firm* — Slater Matsil, LLP

(57) ABSTRACT

This application provides a communication method and a communication apparatus. The method includes: A first core network device obtains a target credential and attribute information of the target credential, and sends the target credential to a terminal device. The first core network device triggers, based on the attribute information of the target credential, the terminal device to perform, by using the target credential, an authentication procedure corresponding to the target credential. According to the communication method provided in this application, the terminal device can learn of a specific authentication procedure that should be performed by using an obtained credential. In other words, according to the method, the terminal device can perform, by using the obtained credential, the authentication procedure corresponding to the credential.

20 Claims, 16 Drawing Sheets

(58) Field of Classification Search
CPC ..... H04W 60/06; H04W 48/16; H04W 48/18; H04W 76/12; H04W 12/08; H04W 8/205; H04W 12/0431; H04W 4/50; H04W 12/069; H04L 63/08; H04L 63/00; H04L 63/0823; H04L 63/062; H04L 9/3263
See application file for complete search history.

(56) References Cited

U.S. PATENT DOCUMENTS

| | | | | |
|---|---|---|---|---|
| 2020/0280854 | A1* | 9/2020 | Kunz | H04W 12/0431 |
| 2021/0058784 | A1* | 2/2021 | Kedalagudde | H04W 76/12 |
| 2024/0064129 | A1* | 2/2024 | Ben Henda | H04L 63/0428 |
| 2024/0121587 | A1* | 4/2024 | Ben Henda | H04L 61/4511 |
| 2024/0187331 | A1* | 6/2024 | Ding | H04W 76/12 |
| 2024/0224163 | A1* | 7/2024 | Starsinic | H04W 48/12 |
| 2024/0314538 | A1* | 9/2024 | Ståhl | H04W 8/183 |

OTHER PUBLICATIONS

3GPP TR 23.700-07 V17.0.0 (Mar. 2021),3rd Generation Partnership Project;Technical Specification Group Services and System Aspects;Study on enhanced support of Non-Public Networks (NPN) (Release 17),total 248 pages.
SA WG2 Meeting #141E S2-2007851,"KI #4,Sol #5:Update to clarify how the UE discovers and selects the onboarding network",Samsung,Oct. 12, 2023 Oct. 2020, Electronic,Elbonia, total 9 pages.
3GPP TR 23.700-07 V1.3.0 (Mar. 2021), 3rd Generation Partnership Project; Technical Specification Group Services and System Aspects; Study on enhanced support of non-public networks (Release 17), total 248 pages.

* cited by examiner

COMMUNICATION METHOD AND COMMUNICATION APPARATUS

CROSS-REFERENCE TO RELATED APPLICATIONS

This application is a continuation of International Application No. PCT/CN2022/092229, filed on May 11, 2022, which claims priority to Chinese Patent Application No. 202110519706.9, filed on May 12, 2021. The disclosures of the aforementioned applications are hereby incorporated by reference in their entireties.

TECHNICAL FIELD

This application relates to the communication field, and more specifically, to a communication method and a communication apparatus in the communication field.

BACKGROUND

A non-public network (NPN) is a network that is different from a public land mobile network (PLMN) and that provides a service for a specific terminal device. Generally, an NPN service may alternatively be provided by the PLMN. For example, the PLMN may provide the NPN service by providing a special slice and/or a special data network. To obtain the NPN service provided by the PLMN, a terminal device needs to perform at least two authentication procedures. The terminal device can obtain the NPN service provided by the PLMN only when the two authentication procedures both succeed.

Because the terminal device needs to perform the at least two authentication procedures, in this case, the terminal device obtains at least two credentials for authentication. If the terminal device uses a credential corresponding to an authentication procedure to perform another authentication procedure, this causes an authentication failure.

SUMMARY

This application provides a communication method and a communication apparatus, so that a terminal device can perform a correct authentication procedure.

According to a first aspect, a communication method is provided. The method includes: A first core network device obtains a target credential and attribute information of the target credential. The first core network device sends the target credential to a terminal device. The first core network device triggers, based on the attribute information of the target credential, the terminal device to perform, by using the target credential, an authentication procedure corresponding to the target credential (that is, to perform, by using the target credential, the authentication procedure corresponding to the target credential).

In the foregoing technical solution, after obtaining the target credential and the attribute information of the target credential, the first core network device sends the target credential to the terminal device, and triggers, based on the attribute information of the target credential, the terminal device to perform, by using the obtained target credential, the authentication procedure corresponding to the target credential, so that the terminal device can learn of the specific authentication procedure that should be performed by using the obtained target credential.

That the first core network device triggers the terminal device to perform, by using the target credential, the authentication procedure corresponding to the target credential may include the following two cases.

Case 1

The first core network device sends the attribute information of the target credential to the terminal device, so that the terminal device performs, based on the attribute information of the target credential by using the target credential, the authentication procedure corresponding to the target credential.

Case 2

The first core network device initiates, based on the attribute information of the target credential, an authentication procedure or a related procedure that can trigger an authentication procedure, so that the terminal device can perform, by using the target credential, the authentication procedure corresponding to the target credential. For example, the authentication procedure corresponding to the target credential is a slice authentication procedure. In this case, the first core network device may initiate the authentication procedure or a deregistration procedure. The deregistration procedure is a related procedure that can trigger the slice authentication procedure.

It should be noted that in the case 2, the first core network device may send the attribute information of the target credential to the terminal device, or may not send the attribute information of the target credential.

With reference to the first aspect, in some implementations of the first aspect, the attribute information of the target credential includes at least one of first attribute information and second attribute information, the first attribute information indicates a type of the target credential, and the second attribute information indicates the authentication procedure corresponding to the target credential.

With reference to the first aspect and the foregoing implementations, in some implementations of the first aspect, that the first core network device triggers, based on the attribute information of the target credential, the terminal device to perform a corresponding authentication procedure by using the target credential includes: The first core network device sends the attribute information corresponding to the target credential to the terminal device, so that the terminal device performs the corresponding authentication procedure by using the target credential based on the attribute information corresponding to the target credential.

In the foregoing technical solution, to trigger the terminal device to perform, by using the target credential, the authentication procedure corresponding to the target credential, the first core network device may send the attribute information of the target credential to the terminal device after obtaining the attribute information of the target credential. After obtaining the attribute information of the target credential, the terminal device may learn of, based on the attribute information of the target credential, at least one of the type of the target credential and the authentication procedure corresponding to the target credential, so that the terminal device can perform, by using the target credential based on at least one of the type of the target credential and the authentication procedure corresponding to the target credential, the authentication procedure corresponding to the target credential.

With reference to the first aspect and the foregoing implementations, in some implementations of the first aspect, the attribute information of the target credential includes at least one of the first attribute information and the second attribute information, the first attribute information indicates that the type of the target credential is a credential used to perform a slice authentication procedure, the second attribute information indicates that the authentication procedure corresponding to the target credential is the slice authentication procedure, and that the first core network device triggers, based on the attribute information of the target credential, the terminal device to perform a corresponding authentication procedure by using the target credential includes: The first core network device triggers a deregistration procedure, so that the terminal device performs the slice authentication procedure by using the target credential after the deregistration procedure is completed.

In the foregoing technical solution, after obtaining the attribute information of the target credential, the first core network device may learn of at least one of the type of the target credential and the authentication procedure corresponding to the target credential. To trigger the terminal device to perform, by using the target credential, the authentication procedure corresponding to the target credential, the first core network device may initiate, based on at least one of the type of the target credential and the authentication procedure corresponding to the target credential, the authentication procedure or a related procedure that can trigger the authentication procedure, so that the terminal device may perform, by using the target credential, the authentication procedure corresponding to the target credential.

For example, the first core network device learns that the authentication procedure corresponding to the target credential is the slice authentication procedure. To trigger the terminal device to perform the slice authentication procedure by using the target credential, the first core network device may trigger the deregistration procedure. The deregistration procedure may trigger the terminal device to perform the slice authentication procedure. For example, after the deregistration procedure is completed, the terminal device may initiate a registration procedure, and perform the slice authentication procedure by using the target credential in a process of performing the registration procedure.

With reference to the first aspect and the foregoing implementations, in some implementations of the first aspect, the attribute information of the target credential includes at least one of the first attribute information and the second attribute information, the first attribute information indicates that the type of the target credential is a credential used to perform a secondary authentication procedure, the second attribute information indicates that the authentication procedure corresponding to the target credential is the secondary authentication procedure, and that the first core network device triggers, based on the attribute information of the target credential, the terminal device to perform a corresponding authentication procedure by using the target credential includes: The first core network device triggers a session management procedure, so that the terminal device performs the secondary authentication procedure by using the target credential in a process of performing the session management procedure.

In the foregoing technical solution, after obtaining the attribute information of the target credential, the first core network device may learn of at least one of the type of the target credential and the authentication procedure corresponding to the target credential. To trigger the terminal device to perform, by using the target credential, the authentication procedure corresponding to the target credential, the first core network device may initiate, based on at least one of the type of the target credential and the authentication procedure corresponding to the target credential, the authentication procedure or a related procedure that can trigger the authentication procedure, so that the terminal device may perform, by using the target credential, the authentication procedure corresponding to the target credential.

For example, the first core network device learns that the authentication procedure corresponding to the target credential is the secondary authentication procedure. To trigger the terminal device to perform the secondary authentication procedure by using the target credential, the first core network device may trigger the session management procedure, so that the terminal device performs the secondary authentication procedure by using the target credential in the process of performing the session management procedure.

With reference to the first aspect and the foregoing implementations, in some implementations of the first aspect, the session management procedure is a session establishment procedure or a session modification procedure.

With reference to the first aspect and the foregoing implementations, in some implementations of the first aspect, that a first core network device obtains a target credential includes: The first core network device obtains the target credential from a service provision server or a second core network device.

With reference to the first aspect and the foregoing implementations, in some implementations of the first aspect, the attribute information of the target credential includes the first attribute information, the first attribute information indicates the type of the target credential, and that the first core network device obtains the first attribute information includes: The first core network device obtains the first attribute information from the service provision server or the second core network device.

With reference to the first aspect and the foregoing implementations, in some implementations of the first aspect, the attribute information of the target credential includes the second attribute information, the second attribute information indicates the authentication procedure corresponding to the target credential, and that the first core network device obtains the second attribute information includes: The first core network device obtains the second attribute information from the second core network device, where the second attribute information is generated by the second core network device based on the first attribute information after the second core network device obtains the first attribute information. Alternatively, after obtaining the first attribute information, the first core network device generates the second attribute information based on the first attribute information.

In an implementation, after obtaining the first attribute information, the second core network device may not perform any processing on the first attribute information, and may only forward the first attribute information. In other words, after obtaining the first attribute information, the second core network device forwards the first attribute information to the first core network device. After receiving the first attribute information, the first core network device may generate the second attribute information based on the first attribute information.

In another implementation, after obtaining the first attribute information, the second core network device may generate the second attribute information based on the first attribute information, and send the at least one of the second attribute information and the first attribute information to the first core network device.

In this application, the first core network device may be one of a core network access and mobility management function (AMF) network element, a unified data management (UDM) network element, and a user plane function (UPF) network element, and the second core network device may be one of the access and mobility management function network element and the unified data management network element.

When the first core network device is the access and mobility management function network element, the second core network device may be the unified data management network element.

According to a second aspect, a communication method is provided. The method includes: A terminal device receives a target credential sent by a first core network device or a service provision server. The terminal device obtains attribute information of the target credential. The terminal device performs a corresponding authentication procedure based on the attribute information of the target credential by using the target credential (that is, performs, by using the target credential, the authentication procedure corresponding to the target credential).

In the foregoing technical solution, after obtaining the target credential, the terminal device further obtains the attribute information of the target credential, and learns of, based on the attribute information of the target credential, the specific authentication procedure that should be performed by using the target credential, so that the terminal device can perform, by using the target credential, the authentication procedure corresponding to the target credential.

The terminal device may obtain the attribute information of the target credential in the following several manners.

Manner 1: The terminal device may obtain the attribute information of the target credential from the first core network device.

The attribute information that is of the target credential and that is obtained by the terminal device from the first core network device may include at least one of first attribute information and second attribute information.

For example, the attribute information that is of the target credential and that is sent by the service provision server to the first core network device includes the first attribute information. After receiving the first attribute information, the first core network device generates the second attribute information based on the first attribute information, and sends the attribute information, of the target credential, including at least one of the first attribute information and the second attribute information to the terminal device.

For another example, the attribute information that is of the target credential and that is sent by the service provision server to a second core network device includes the first attribute information. After receiving the first attribute information, the second core network device generates the second attribute information based on the first attribute information, and sends the attribute information, of the target credential, including at least one of the first attribute information and the second attribute information to the first core network device. Further, the first core network device sends the attribute information, of the target credential, including at least one of the first attribute information and the second attribute information to the terminal device.

Manner 2: The terminal device may obtain the attribute information of the target credential from the service provision server.

The attribute information that is of the target credential and that is obtained by the terminal device from the service provision server may include the first attribute information. For example, the attribute information that is of the target credential and that is sent by the service provision server to the first core network device includes the first attribute information. The first core network device does not perform any processing on the attribute information of the target credential from the service provision server, and only forwards the attribute information of the target credential. In other words, the first core network device sends the attribute information, of the target credential, including the first attribute information to the terminal device.

Manner 3: The terminal device obtains the attribute information of the target credential based on an authentication procedure initiated by the first core network device.

After receiving the attribute information of the target credential from the service provision server, the first core network device may trigger, based on the attribute information of the target credential, the terminal device to perform, by using the target credential, the authentication procedure corresponding to the target credential. For example, if the attribute information of the target credential includes the first attribute information, the first core network device may determine a type of the target credential based on the first attribute information, determine the authentication procedure corresponding to the target credential, and further trigger a related procedure for the authentication procedure, so that the terminal device is triggered by using the related procedure, to perform, by using the target credential, the authentication procedure corresponding to the target credential.

For example, the first attribute information indicates that the type of the target credential is a credential used to perform a slice authentication procedure. In this case, the first core network device may initiate a deregistration procedure (for example, an example of the related procedure). The slice authentication procedure is performed after the deregistration procedure is completed. For example, the slice authentication procedure is completed in a registration procedure initiated by the terminal after the deregistration procedure is completed. Therefore, after sensing the deregistration procedure, the terminal device may learn that the type of the recently received target credential is the credential used to perform slice authentication, and may also learn that the authentication procedure corresponding to the target credential is the slice authentication procedure. In other words, after sensing the deregistration procedure, the terminal device may learn of the attribute information of the target credential.

With reference to the second aspect, in some implementations of the second aspect, the attribute information of the target credential includes at least one of the first attribute information and the second attribute information, the first attribute information indicates the type of the target credential, and the second attribute information indicates the authentication procedure corresponding to the target credential.

With reference to the second aspect and the foregoing implementations, in some implementations of the second aspect, the attribute information of the target credential includes at least one of the first attribute information and the second attribute information, the first attribute information indicates that the type of the target credential is the credential used to perform the slice authentication procedure, the second attribute information indicates that the authentication procedure corresponding to the target credential is the slice authentication procedure, and that the terminal device performs a corresponding authentication procedure based on the attribute information of the target credential by using the target credential includes: The terminal device performs the registration procedure based on the attribute information of the target credential, and performs the slice authentication procedure by using the target credential in a process of performing the registration procedure.

In the foregoing technical solution, after the terminal device learns of at least one of the type of the target credential being the credential used to perform the slice authentication procedure and the authentication procedure corresponding to the target credential being the slice authentication procedure, the terminal device may actively initiate the registration procedure, and perform the slice authentication procedure in the process of performing the registration procedure. Alternatively, the registration procedure may be passively initiated by the terminal device. For example, the first core network device first initiates the deregistration procedure, and the terminal device may initiate the registration procedure after the deregistration procedure is completed, and perform the slice authentication procedure by using the target credential in the process of performing the registration procedure.

With reference to the second aspect and the foregoing implementations, in some implementations of the second aspect, the registration procedure is any one of an initial registration procedure, a mobile registration update procedure, a periodic registration update procedure, and an emergency registration procedure.

With reference to the second aspect and the foregoing implementations, in some implementations of the second aspect, the attribute information of the target credential includes at least one of the first attribute information and the second attribute information, the first attribute information indicates that the type of the target credential is a credential used to perform a secondary authentication procedure, the second attribute information indicates that the authentication procedure corresponding to the target credential is the secondary authentication procedure, and that the terminal device performs a corresponding authentication procedure based on the attribute information of the target credential by using the target credential includes: The terminal device performs a session management procedure based on the attribute information of the target credential, and performs the secondary authentication procedure by using the target credential in a process of performing the session management procedure.

In the foregoing technical solution, after the terminal device learns of at least one of the type of the target credential being the credential used to perform the secondary authentication procedure and the authentication procedure corresponding to the target credential being the secondary authentication procedure, the terminal device may actively initiate the session management procedure, and perform the secondary authentication procedure in the process of performing the session management procedure, or the session management procedure may be initiated by the first core network device, so that the terminal device performs the secondary authentication procedure by using the target credential in the process of performing the session management procedure.

With reference to the second aspect and the foregoing implementations, in some implementations of the second aspect, the session management procedure is a session establishment procedure or a session modification procedure.

According to a third aspect, a communication method is provided. The method includes: A service provision server obtains a target credential and attribute information of the target credential. The service provision server sends the target credential and the attribute information of the target credential to a first core network device.

In the foregoing technical solution, the service provision server sends the target credential and the attribute information of the target credential to the first core network device, so that the first core network device may learn of, based on the attribute information of the target credential, at least one of a type of the target credential and an authentication procedure corresponding to the target credential, and trigger, based on the attribute information of the target credential, a terminal device to perform, by using the target credential, the authentication procedure corresponding to the target credential. In this way, the terminal device performs, by using the target credential, the authentication procedure corresponding to the target credential.

With reference to the third aspect, in some implementations of the third aspect, the attribute information of the target credential includes at least one of first attribute information and second attribute information, the first attribute information indicates the type of the target credential, and the second attribute information indicates the authentication procedure corresponding to the target credential.

With reference to the third aspect and the foregoing implementations, in some implementations of the third aspect, the method further includes: The service provision server obtains status information of the terminal device. That the service provision server sends the target credential and the attribute information of the target credential to a first core network device includes: When the status information of the terminal device meets a preset condition, the service provision server sends the target credential and the attribute information of the target credential to the first core network device.

In the foregoing technical solution, the service provision server obtains the status information of the terminal device, and sends the target credential and the attribute information of the target credential to the first core network device only when the status information of the terminal device meets the preset condition, to optimize a mechanism in which the service provision server delivers the target credential and the attribute information of the target credential.

With reference to the third aspect and the foregoing implementations, in some implementations of the third aspect, the status information includes registration state information or location information.

With reference to the third aspect and the foregoing implementations, in some implementations of the third aspect, the preset condition is: the registration state information of the terminal device indicates that the terminal device is in a registered state; or the location information of the terminal device indicates that the terminal device is located in a target tracking area or a target cell, where the target tracking area is a tracking area in which a non-public network service can be provided, and the target cell is a cell in which the non-public network service can be provided.

With reference to the third aspect and the foregoing implementations, in some implementations of the third aspect, the target credential is a credential used to perform a slice authentication procedure or a credential used to perform a secondary authentication procedure.

According to a fourth aspect, a communication method is provided. The method includes: A service provision server obtains a target credential. The service provision server sends the target credential to a terminal device, so that after obtaining attribute information of the target credential, the terminal device performs a corresponding authentication procedure by using the target credential (that is, performs, by using the target credential, the authentication procedure corresponding to the target credential).

In an implementation, the target credential may be modified, so that a modified target credential carries first attribute information, where the first attribute information indicates a type of the target credential.

With reference to the fourth aspect, in some implementations of the fourth aspect, the attribute information of the target credential includes at least one of first attribute information and second attribute information, the first attribute information indicates a type of the target credential, and the second attribute information indicates the authentication procedure corresponding to the target credential.

With reference to the fourth aspect and the foregoing implementations, in some implementations of the fourth aspect, the method further includes: The service provision server sends the attribute information of the target credential to the terminal device.

With reference to the fourth aspect and the foregoing implementations, in some implementations of the fourth aspect, the method further includes: The service provision server obtains status information of the terminal device. That the service provision server sends the target credential to a terminal device includes: When the status information of the terminal device meets a preset condition, the service provision server sends the target credential to the terminal device.

With reference to the fourth aspect and the foregoing implementations, in some implementations of the fourth aspect, the status information includes registration state information or location information.

With reference to the fourth aspect and the foregoing implementations, in some implementations of the fourth aspect, the preset condition is: the registration state information of the terminal device indicates that the terminal device is in a registered state; or the location information of the terminal device indicates that the terminal device is located in a target tracking area or a target cell, where the target tracking area is a tracking area in which a non-public network service can be provided, and the target cell is a cell in which the non-public network service can be provided.

With reference to the fourth aspect and the foregoing implementations, in some implementations of the fourth aspect, the target credential is a credential used to perform a slice authentication procedure or a credential used to perform a secondary authentication procedure.

According to a fifth aspect, a communication apparatus is provided. The apparatus is configured to perform the method in any possible implementation of the foregoing aspects. Specifically, the apparatus includes a unit configured to perform the method in any possible implementation of the foregoing aspects.

According to a sixth aspect, a communication apparatus is provided, including a processor. The processor is coupled to a memory, and may be configured to execute instructions in the memory, to implement the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

In a possible implementation, the apparatus further includes the memory. In a possible implementation, the apparatus further includes a communication interface, and the processor is coupled to the communication interface.

In an implementation, the apparatus is a first core network device. When the apparatus is the first core network device, the communication interface may be a transceiver or an input/output interface.

In another implementation, the apparatus is a chip disposed in the first core network device. When the apparatus is the chip configured in the first core network device, the communication interface may be an input/output interface.

In an implementation, the apparatus is a terminal device. When the apparatus is the terminal device, the communication interface may be a transceiver or an input/output interface.

In another implementation, the apparatus is a chip disposed in the terminal device. When the apparatus is the chip disposed in the terminal device, the communication interface may be an input/output interface.

In an implementation, the apparatus is a service provision server. When the apparatus is the service provision server, the communication interface may be a transceiver or an input/output interface.

In another implementation, the apparatus is a chip disposed in the service provision server. When the apparatus is the chip disposed in the service provision server, the communication interface may be an input/output interface.

According to a seventh aspect, a processor is provided. The processor includes an input circuit, an output circuit, and a processing circuit. The processing circuit is configured to receive a signal through the input circuit, and transmit a signal through the output circuit, so that the processor performs the method in any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this application.

According to an eighth aspect, an apparatus is provided. The apparatus includes a processor and a memory. The processor is configured to read instructions stored in the memory, and may receive a signal through a receiver, and transmit a signal through a transmitter, to perform the method in any possible implementation of the foregoing aspects.

In a possible implementation, there are one or more processors, and there are one or more memories.

In a possible implementation, the memory may be integrated with the processor, or the memory and the processor may be separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this application.

The apparatus may be a chip. The processor may be implemented by hardware, or may be implemented by software. When the processor is implemented by the hardware, the processor may be a logic circuit, an integrated circuit, or the like; or when the processor is implemented by the software, the processor may be a general-purpose processor, and is implemented by reading software code stored in the memory. The memory may be integrated into the processor, or may be located outside the processor and exist independently.

According to a ninth aspect, a communication system is provided. The system includes one or more of the first core network device, the second core network device, the terminal device, and the service provision server that are mentioned above.

According to a tenth aspect, a computer program product is provided. The computer program product includes a computer program (which may also be referred to as code or instructions). When the computer program is run, a computer is enabled to perform the method in any possible implementation of the foregoing aspects.

According to an eleventh aspect, a computer-readable storage medium is provided. The computer-readable storage medium stores a computer program (which may also be referred to as code or instructions). When the computer program is run on a computer, the computer is enabled to perform the method in any possible implementation of the foregoing aspects.

DETAILED DESCRIPTION OF ILLUSTRATIVE EMBODIMENTS

The following describes the technical solutions in embodiments of this application with reference to the accompanying drawings in embodiments of this application. In the descriptions of this application, "/" represents an "or" relationship between associated objects unless otherwise specified. For example, A/B may represent A or B. The term "and/or" in this application describes only an association relationship between associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be used for various communication systems, for example, new radio (NR) in a 5th generation (5G) mobile communication system and a future mobile communication system.

Figure 1:
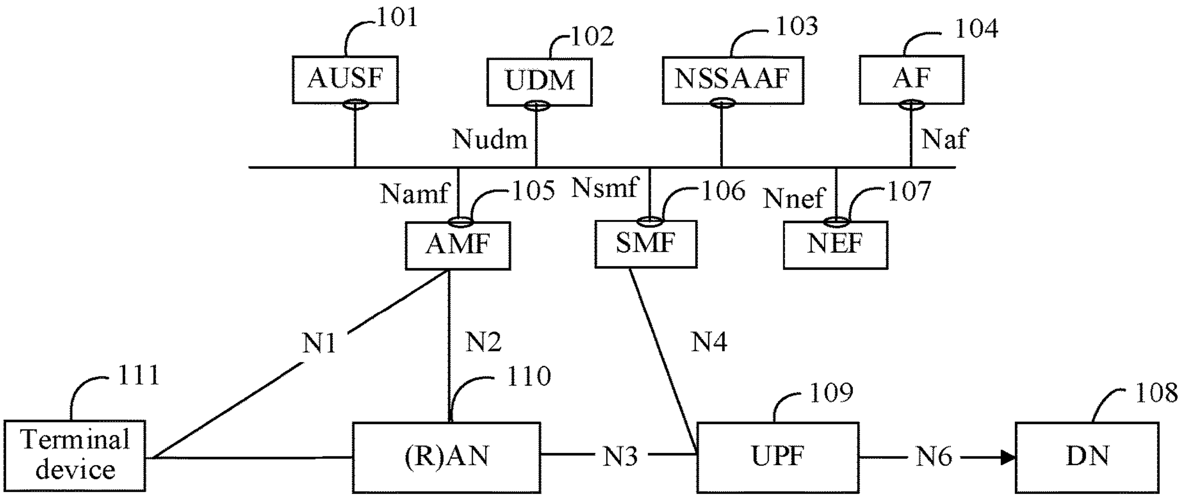
FIG. 1 is a schematic diagram of a system architecture according to an embodiment of this application.

FIG. 1 is a schematic diagram of a network architecture applied to an embodiment of this application. The network architecture is a network architecture described from a perspective of a service-based interface. The following separately describes network elements in the network architecture.

1. (Radio) access network ((R)AN) network element: The (radio) access network element is configured to provide a network access function for an authorized terminal device in a specific area, and can use transmission tunnels of different quality based on a level of the terminal device, a service requirement, and the like.

The (R)AN network element can manage radio resources and provide an access service for the terminal device, to forward a control signal and terminal device data between the terminal device and a core network. The (R)AN network element may also be understood as a base station in a conventional network.

2. User plane network element: The user plane network element is configured to perform packet routing and forwarding, quality of service (QoS) processing on user plane data, and the like.

In a 5G communication system, the user plane network element may be a user plane function (UPF) network element. In a future communication system, the user plane network element may still be the UPF network element, or may have another name. This is not limited in this application.

3. Data network: The data network is a network used to provide transmitted data.

In the 5G communication system, the data network may be a data network (DN). In the future communication system, the data network may still be the DN, or may have another name. This is not limited in this application.

4. Access management network element: The access management network element is mainly used for mobility management, access management, and the like, and may be configured to implement functions, for example, lawful interception and access authorization/authentication, other than session management in functions of a mobility management entity (MME).

In the 5G communication system, the access management network element may be an access and mobility management function (AMF) network element. In the future communication system, the access management network element may still be the AMF network element, or may have another name. This is not limited in this application.

5. Session management network element: The session management network element is mainly configured to manage a session, allocate and manage an internet protocol (IP) address of a terminal device, select an endpoint that can manage a user plane function interface and a policy control and charging function interface, notify downlink data, and so on.

In the 5G communication system, the session management network element may be a session management function (SMF) network element. In the future communication system, the session management network element may still be the SMF network element, or may have another name. This is not limited in this application.

6. Network exposure network element: The network exposure network element is configured to securely expose, to the outside, a service, a capability, and the like that are provided by a 3GPP network function network element.

In the 5G communication system, the network exposure network element may be a network exposure function (NEF) network element. In the future communication system, the network exposure network element may still be the NEF network element, or may have another name. This is not limited in this application.

7. Unified data management network element: The unified data management network element is configured to process a user identifier, perform access authentication, registration, mobility management, and the like.

In the 5G communication system, the unified data management network element may be a unified data management (UDM) network element. In the future communication system, the unified data management network element may still be the UDM network element, or may have another name. This is not limited in this application.

8. Authentication server network element: The authentication server network element is configured to perform primary authentication, that is, authentication between a terminal device and an operator network. After receiving an authentication request initiated by a subscriber, the authentication server network element may perform authentication and/or authorization on the subscriber by using authentication information and/or authorization information stored in the unified data management network element, or generate authentication and/or authorization information of the subscriber through the unified data management network element. The authentication server network element may feed back the authentication information and/or the authorization information to the subscriber. In an implementation, the authentication server network element may alternatively be co-located with the unified data management network element.

In the 5G communication system, the authentication server network element may be an authentication server function (AUSF) network element. In the future communication system, the unified data management may still be the AUSF network element, or may have another name. This is not limited in this application.

9. Application network element: The application network element is configured to perform application-affected data routing, access the network exposure function network element, interact with a policy framework to perform policy control, and the like.

In the 5G communication system, the application network element may be an application function (AF) network element. In the future communication system, the application network element may still be the AF network element, or may have another name. This is not limited in this application.

10. Terminal device: The terminal device may include various handheld devices, vehicle-mounted devices, wearable devices, or computing devices that have a wireless communication function, or another processing device connected to a wireless modem, and terminals, mobile stations (MSs), terminals, user equipment (UE), software terminals, and the like that are in various forms, such as a water meter, an electricity meter, or a sensor.

In the network architecture, Namf is a service-based interface presented by the AMF network element 105, Nsmf is a service-based interface presented by the SMF network element 106, Nnef is a service-based interface presented by the NEF network element 107, Nudm is a service-based interface presented by the UDM network element 102, and Naf is a service-based interface presented by the AF network element 104. N1 is a reference point between the terminal device 111 and the AMF network element 105. N2 is a reference point between the (R)AN network element no and the AMF network element 105, and is used to send a non-access stratum (NAS) message and the like. N3 is a reference point between the (R)AN network element no and the UPF network element 109, and is used to transmit user plane data and the like. N4 is a reference point between the SMF network element 106 and the UPF network element 109, and is used to transmit information such as tunnel identification information of an N3 connection, data buffer attribute information, and a downlink data notification message. An N6 interface is a reference point between the UPF network element 109 and the DN 108, and is used to transmit user plane data and the like.

It should be noted that names of the network elements (for example, the UPF network element 109 and the UDM network element 102) included in FIG. 1 are merely names, and the names do not constitute a limitation on functions of the network elements. In a 5G network and another future network, the foregoing network elements may alternatively have other names. This is not specifically limited in embodiments of this application. For example, in a 6G network, some or all of the foregoing network elements may still use terms in 5G, or may have other names. A general description is provided herein. Details are not described again below. In addition, it may be understood that the network element or the function may be a network element in a hardware device, may be a software function running on dedicated hardware, or may be a virtualization function instantiated on a platform (for example, a cloud platform). One or more services may be obtained through division for the network elements or the functions. Further, services that exist independently of network functions may occur. In this application, instances of the functions, instances of services included in the functions, or instances of the services that exist independently of network functions may be referred to as service instances.

It should be noted that the network elements in FIG. 1 do not necessarily exist simultaneously, and required network elements may be determined based on a requirement. A connection relationship between the network elements in FIG. 1 is not uniquely determined, and may be adjusted based on a requirement.

For ease of understanding embodiments of this application, a network and related terms in this application are first briefly described.

Non-Public Network (NPN)

Different from a public network, the NPN is a network providing a service for a specific subscriber. In a definition in the 3GPP protocol TS 23.501, there are two types of NPNs based on whether a core network (CN) is independent.

1. Standalone NPN (SNPN)

The SNPN is not dependent on a PLMN, but is operated by an SNPN operator. It may be understood that a core network of the SNPN is independent of the PLMN. In other words, the core network of the SNPN is independently operated by the SNPN.

2. Non-standalone NPN (PNI-NPN): The network is dependent on the PLMN. In other words, the PNI-NPN is operated by a conventional operator. It may be understood that the PNI-NPN is actually a PLMN, and the PLMN provides a special network slice and/or a special data network to provide an NPN service. In short, the PNI-NPN isolates a public network service from an NPN service through a slice, to provide the NPN service for a terminal device in the NPN.

A network architecture of the PNI-NPN is the same as a network architecture of the PLMN, and each of the network architectures of the PNI-NPN and the PLMN may be that shown in FIG. 1.

To obtain the NPN service, the terminal device first needs to access a network slice provided by the PLMN for the terminal device. To access the network slice, the terminal device needs to perform a slice authentication procedure by using a slice authentication credential. The terminal device can successfully access the network slice only when the slice authentication procedure of the terminal device succeeds. After accessing the network slice, the terminal device further needs to establish a session to obtain the NPN service. In a session establishment procedure, the terminal device further needs to perform a secondary authentication procedure by using a secondary authentication credential, and the terminal device can successfully establish the session only when the secondary authentication procedure of the terminal device succeeds. After the session is established, the terminal device may modify the established session. When the established session needs to be modified, the terminal device may initiate a session modification procedure. The terminal device may perform a secondary authentication procedure in a process of performing the session modification procedure. When the secondary authentication procedure of the terminal device succeeds, it indicates that the established session is successfully modified. In this application, the session establishment procedure and the session modification are collectively referred to as a session management procedure.

Various credentials required for performing the foregoing authentication procedures may be sent by a provision server (PVS) to the terminal device. In other words, the provision server is configured to provide a credential for the terminal device. It should be noted that a name of a server that provides a credential for the terminal device is not particularly limited in this application. The foregoing server that provides the credential may also be referred to as a credential provision server, a service provision server, or a certificate provision server.

Figure 2:
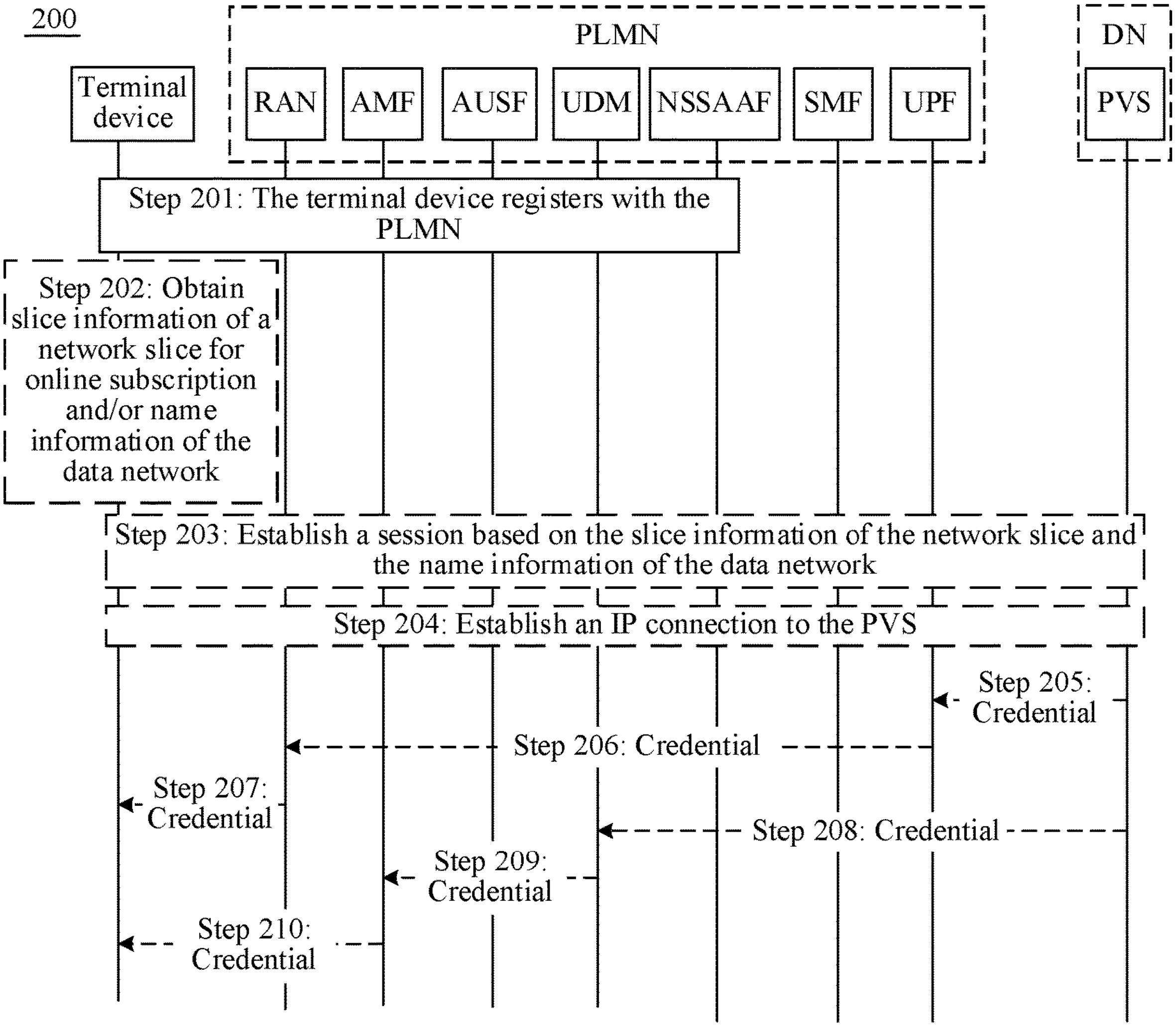
FIG. 2 is a schematic diagram of an example of a communication method according to an embodiment of this application.

The following describes, with reference to FIG. 2, a method 200 used by a terminal device to obtain a credential according to this application. It should be noted that a process in which "the terminal device obtains the credential" in this application may also be referred to as "online subscription". For ease of description, a number of a network element is omitted below. For example, in the following, a "UPF network element" indicates a "UPF network element 109", and a "UDM network element" indicates a "UDM network element 102".

Step 201: The terminal device registers with a PLMN.

The terminal device registers with the PLMN. The PLMN herein is a PLMN to which a PNI-NPN belongs.

Step 202: The terminal device obtains slice information of a network slice for online subscription and/or name information of a data network.

The slice information of the network slice may be single network slice selection assistance information (S-NSSAI) or network slice selection assistance information (NSSAI), and the name information of the data network may be a data network name (DNN).

The information in step 202 may be preconfigured on the terminal device before the terminal device registers with the PLMN, or may be obtained by the terminal device from a network side. For example, the terminal device may obtain the information from the network side before, in a process in which, or after the terminal device registers with the PLMN.

Step 203: The terminal device establishes a session based on the slice information of the network slice and the name information of the data network.

The terminal device establishes the session based on the slice information of the network slice and the name information of the data network in step 202. The session established herein is used by the terminal device to obtain a credential from a PVS. The session may be, for example, a protocol data unit (PDU) session.

Step 204: The terminal device establishes an internet protocol (IP) connection to the PVS.

Step 205 to step 207: The PVS sends the credential to the terminal device through the UPF network element and a RAN network element.

Step 208 to step 210: The PVS sends the credential to the terminal device through the UDM network element and an AMF network element. It should be noted that if the PVS is a trusted device, the PVS may directly send the credential to the UDM network element. If the PVS is an untrusted device, the PVS may send the credential to the UDM network element through an NEF network element (not shown in FIG. 2).

It should be noted that when delivering the credential to the terminal device, the PVS may deliver the credential through a user plane channel, or may deliver the credential through a control plane channel. When the credential is delivered through the user plane channel, step 208 to step 210 in the method 200 may not be performed. In other words, only step 201 to step 204 and step 205 to step 207 are performed. When the credential is delivered through the control plane channel, step 202 to step 204 and step 205 to step 207 in the method 200 may not be performed. In other words, only step 201 and step 208 to step 210 are performed.

In the method 200, there may be more than one type of credential sent by the PVS to the terminal device through the control plane channel or the user plane channel. For example, in a scenario in which the PLMN provides an NPN service, the PVS delivers a credential for slice authentication and a credential for secondary authentication in a session management procedure to the terminal device. The terminal device can obtain the NPN service only when slice authentication performed by the terminal device by using the slice credential succeeds, and/or secondary authentication performed by the terminal device by using the secondary authentication credential succeeds in the session management procedure.

However, when the PVS delivers more than one type of credential to the terminal device, the terminal device needs to learn of a specific credential used to perform an authentication procedure. Otherwise, even if the terminal device obtains the credential, the terminal device cannot learn of a specific authentication procedure that should be performed by using the obtained credential.

In view of this, this application provides a communication method, so that a terminal device can learn of a specific authentication procedure that should be performed by using an obtained credential.

Figure 3:
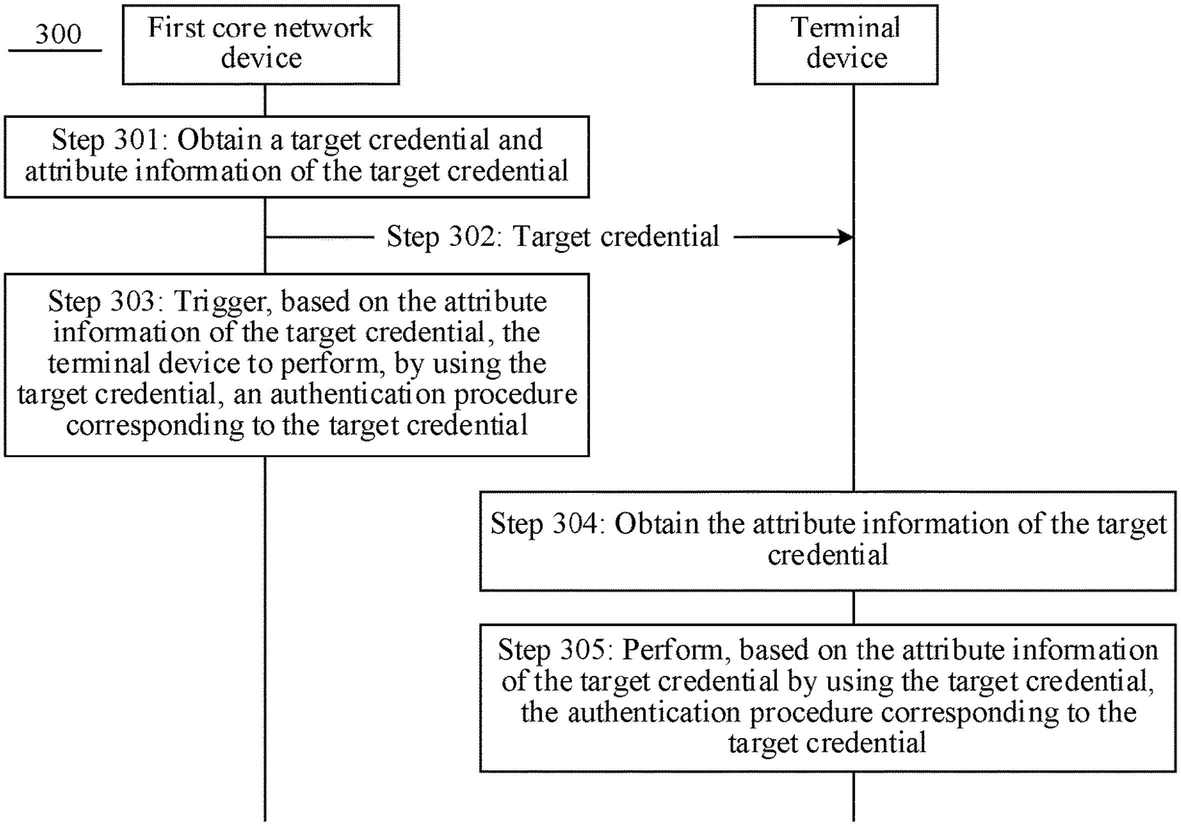
FIG. 3 is a schematic diagram of another example of a communication method according to an embodiment of this application.
Figure 4:
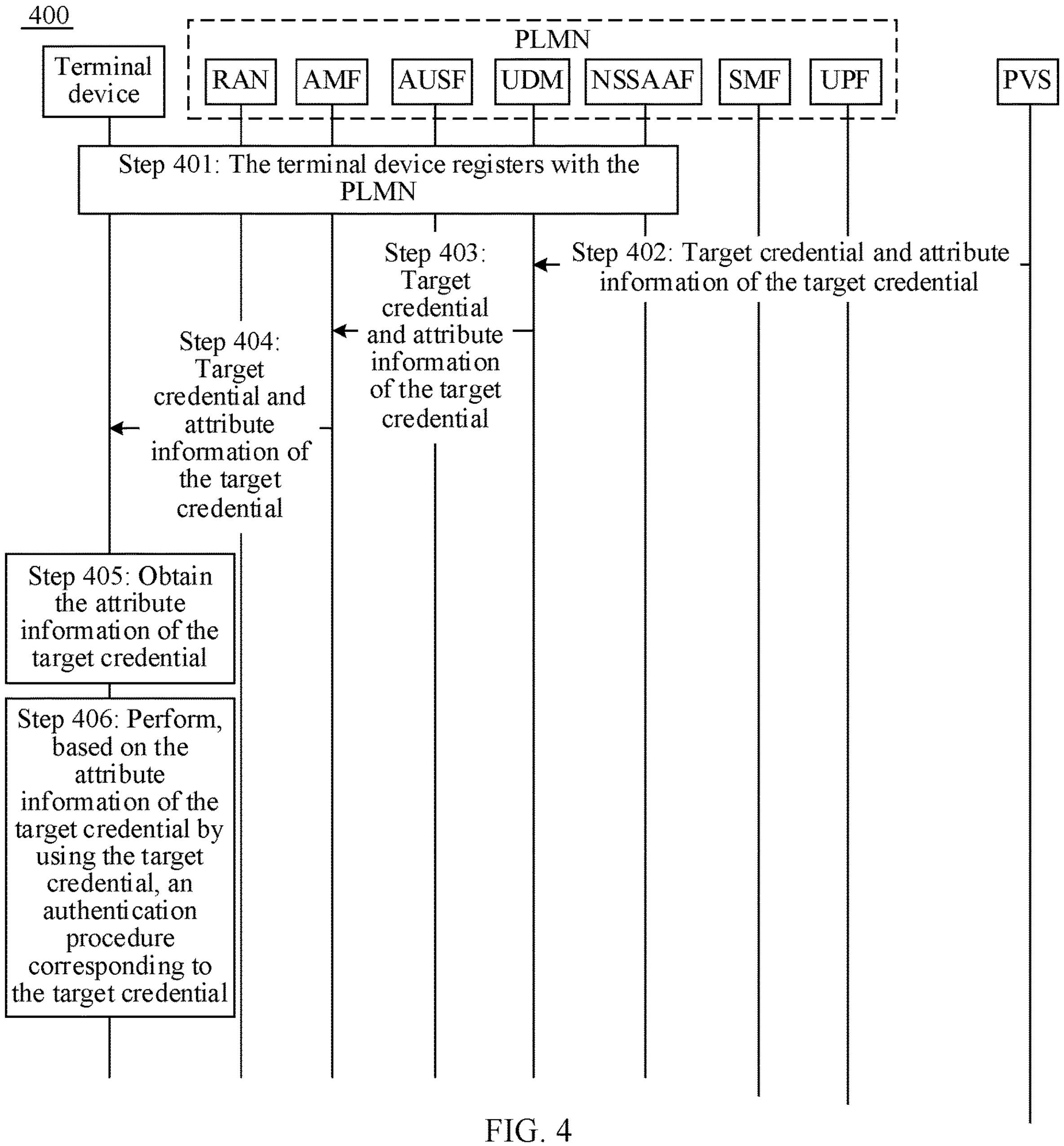
FIG. 4 is a schematic diagram of another example of a communication method according to an embodiment of this application.

The following describes in detail a communication method provided in this application. Based on the method 200 in FIG. 2, a communication method 300 provided in this application is first described with reference to FIG. 3.

Step 301: A first core network device obtains a target credential and attribute information of the target credential.

The first core network device may obtain the target credential and the attribute information of the target credential from a PVS. For example, after obtaining the target credential and the attribute information of the target credential, the PVS sends the target credential and the attribute information of the target credential to the first core network device. That the PVS obtains the target credential and the attribute information of the target credential includes: The PVS generates the target credential and the attribute information of the target credential.

The attribute information of the target credential may indicate at least one of a type of the target credential and an authentication procedure corresponding to the target credential. In other words, the first core network device may determine, based on the attribute information of the target credential, at least one of the type of the target credential and the authentication procedure corresponding to the target credential. The type of the target credential may indicate that the target credential is a credential used to perform a specific authentication procedure. For example, the type of the target credential may indicate that the target credential is a credential used to perform a slice authentication procedure, or the type of the target credential may indicate that the target credential is a credential used to perform a secondary authentication procedure.

For example, the attribute information of the target credential includes at least one of first attribute information and second attribute information, the first attribute information indicates the type of the target credential, and the second attribute information indicates the authentication procedure corresponding to the target credential.

For example, in an implementation, the first attribute information may include several bits. For example, the first attribute information includes one bit. When a value of the bit is 0, it indicates that the type of the target credential is the credential used to perform the slice authentication procedure; or when a value of the bit is 1, it indicates that the type of the target credential is the credential used to perform the secondary authentication procedure.

In another implementation, the first attribute information may include several character strings. For example, when a character string included in the first attribute information is any one of "slice", "slice authentication", "slice-specific authentication", and "slice-specific authentication and authorization", it indicates that the type of the target credential is the credential used to perform the slice authentication procedure; or when a character string included in the first attribute information is "secondary" or "secondary authorization or authentication", it indicates that the type of the target credential is the credential used to perform the secondary authentication procedure.

For example, in an implementation, the second attribute information may include several bits. For example, the second attribute information includes one bit. When a value of the bit is 0, it indicates that the authentication procedure corresponding to the target credential is the slice authentication procedure; or when a value of the bit is 1, it indicates that the authentication procedure corresponding to the target credential is the secondary authentication procedure.

In another implementation, the second attribute information may include several character strings. For example, when a character string included in the second attribute information is any one of "slice authentication procedure", "slice-specific authentication procedure", and "slice-specific authentication and authorization procedure", it indicates that the authentication procedure corresponding to the target credential is the slice authentication procedure; or when a character string included in the second attribute information is "secondary procedure" or "secondary authorization or authentication procedure", it indicates that the authentication procedure corresponding to the target credential is the secondary authentication procedure.

In an implementation, after obtaining or generating the target credential and the attribute information of the target credential, the PVS may directly send the target credential and the attribute information of the target credential to the terminal device.

In another implementation, the PVS may obtain status information of the terminal device, and the PVS sends the target credential and the attribute information of the target credential to the terminal device only when the status information of the terminal device meets a preset condition.

The PVS may obtain the status information of the terminal device in the following manner.

For example, the PVS may subscribe to the status information of the terminal device from the first core network device. After obtaining the status information of the terminal device, the first core network device notifies the status information of the terminal device to the PVS.

For example, the status information of the terminal device may include at least one of registration state information and location information. In this case, the preset condition may be: the registration state information of the terminal device indicates that the terminal device is in a registered state; or the location information of the terminal device indicates that the terminal device is in a target tracking area or a target cell, where the target tracking area is a tracking area in which a non-public network service can be provided, and the target cell is a cell in which the non-public network service can be provided.

The PVS determines, based on whether the obtained status information of the terminal device meets the preset condition, whether to send the target credential and the attribute information of the target credential to the terminal device.

For example, the status information of the terminal device obtained by the PVS is the registration state information of the terminal device. It is assumed that the registration state information of the terminal device indicates that the terminal device is in the registered state. In this case, the PVS may send the target credential and the attribute information of the target credential to the terminal device.

Step 302: The first core network device sends the target credential to the terminal device. Correspondingly, the terminal device receives the target credential from the first core network device.

Step 303: The first core network device triggers, based on the attribute information of the target credential, the terminal device to perform, by using the target credential, the authentication procedure corresponding to the target credential.

For example, the attribute information of the target credential includes at least one of the first attribute information and the second attribute information, the first attribute information indicates the type of the target credential, and the second attribute information indicates the authentication procedure corresponding to the target credential. Therefore, after obtaining the attribute information of the target credential, the first core network device may determine, based on the attribute information of the target credential, at least one of the type of the target credential and the authentication procedure corresponding to the target credential, so that the first core network device may trigger the terminal device to perform, by using the target credential, the authentication procedure corresponding to the target credential.

That the first core network device triggers the terminal device to perform, by using the target credential, the authentication procedure corresponding to the target credential may include the following two cases.

Case 1

The first core network device sends the attribute information of the target credential to the terminal device, so that the terminal device performs, based on the attribute information of the target credential by using the target credential, the authentication procedure corresponding to the target credential.

Case 2

The first core network device initiates, based on the attribute information of the target credential, an authentication procedure or a related procedure that can trigger an authentication procedure, so that the terminal device can perform, by using the target credential, the authentication procedure corresponding to the target credential. For example, the authentication procedure corresponding to the target credential is the slice authentication procedure. In this case, the first core network device may initiate the authentication procedure or a deregistration procedure. The deregistration procedure is a related procedure that can trigger the slice authentication procedure.

It should be noted that in the case 2, the first core network device may send the attribute information of the target credential to the terminal device, or may not send the attribute information of the target credential.

Step 304: The terminal device obtains the attribute information of the target credential.

The terminal device may obtain the attribute information of the target credential in the following several manners:

Manner 1

The terminal device may obtain the attribute information of the target credential from the first core network device.

The attribute information that is of the target credential and that is obtained by the terminal device from the first core network device may include at least one of the first attribute information and the second attribute information.

For example, the attribute information that is of the target credential and that is sent by the PVS to the first core network device includes the first attribute information. After receiving the first attribute information, the first core network device generates the second attribute information based on the first attribute information, and sends the attribute information, of the target credential, including at least one of the first attribute information and the second attribute information to the terminal device.

For another example, the attribute information that is of the target credential and that is sent by the PVS to a second core network device includes the first attribute information. After receiving the first attribute information, the second core network device generates the second attribute information based on the first attribute information, and sends the attribute information, of the target credential, including at least one of the first attribute information and the second attribute information to the first core network device. Further, the first core network device sends the attribute information, of the target credential, including at least one of the first attribute information and the second attribute information to the terminal device.

Manner 2

The terminal device may obtain the attribute information of the target credential from the PVS.

The attribute information that is of the target credential and that is obtained by the terminal device from the PVS may include the first attribute information. For example, the attribute information that is of the target credential and that is sent by the PVS to the first core network device includes the first attribute information. The first core network device does not perform any processing on the attribute information of the target credential from the PVS, and only forwards the attribute information of the target credential. In other words, the first core network device sends the attribute information, of the target credential, including the first attribute information to the terminal device.

Manner 3

The terminal device obtains the attribute information of the target credential based on the authentication procedure initiated by the first core network device.

After receiving the attribute information of the target credential from the PVS, the first core network device may trigger, based on the attribute information of the target credential, the terminal device to perform, by using the target credential, the authentication procedure corresponding to the target credential. For example, if the attribute information of the target credential includes the first attribute information, the first core network device may determine the type of the target credential based on the first attribute information, determine the authentication procedure corresponding to the target credential, and further trigger a related procedure for the authentication procedure, so that the terminal device is triggered by using the related procedure, to perform, by using the target credential, the authentication procedure corresponding to the target credential.

For example, the first attribute information indicates that the type of the target credential is the credential used to perform the slice authentication procedure. In this case, the first core network device may initiate the deregistration procedure (for example, an example of the related procedure). The slice authentication procedure is performed after the deregistration procedure is completed. For example, the slice authentication procedure is completed in a registration procedure initiated by the terminal after the deregistration procedure is completed. Therefore, after sensing the deregistration procedure, the terminal device may learn that the type of the recently received target credential is the credential used to perform slice authentication, and may also learn that the authentication procedure corresponding to the target credential is the slice authentication procedure. In other words, after sensing the deregistration procedure, the terminal device may learn of the attribute information of the target credential.

Step 305: The terminal device performs, based on the attribute information of the target credential by using the target credential, the authentication procedure corresponding to the target credential. It should be noted that step 305 may alternatively be replaced with the following: The terminal device performs the corresponding authentication procedure based on the attribute information of the target credential by using the target credential.

After the terminal device obtains the attribute information of the target credential in any one of the manner 1 to the manner 3, the terminal device may perform, by using the target credential, the authentication procedure corresponding to the target credential.

For example, the attribute information that is of the target credential and that is obtained by the terminal device includes at least one of the first attribute information and the second attribute information, the first attribute information indicates that the type of the target credential is the credential used to perform the slice authentication procedure, the second attribute information indicates that the authentication procedure corresponding to the target credential is the slice authentication procedure, and the terminal device may perform the slice authentication procedure by using the target credential. In this case, there are the following two cases.

Case 1

The terminal device may perform the slice authentication procedure in a process of performing the registration procedure. For example, the terminal device may initiate one of registration procedures such as an initial registration procedure, a mobile registration update procedure, a periodic registration update procedure, and an emergency registration procedure. Assuming that the terminal device initiates the mobile registration procedure, the terminal device may perform the slice authentication procedure in a process of performing the mobile registration procedure.

Case 2

The first core network device initiates the deregistration procedure, and the terminal device may perform the slice authentication procedure by using the target credential after the deregistration procedure is completed. For example, the terminal device initiates the registration procedure after the deregistration procedure is completed, and performs the slice authentication procedure by using the target credential in the registration procedure. Alternatively, the first core network device initiates the slice authentication procedure, so that the terminal device performs the slice authentication procedure by using the target credential.

For another example, the attribute information that is of the target credential and that is obtained by the terminal device includes at least one of the first attribute information and the second attribute information, the first attribute information indicates that the type of the target credential is the credential used to perform the secondary authentication procedure, the second attribute information indicates that the authentication procedure corresponding to the target credential is the secondary authentication procedure, and the terminal device may perform the secondary authentication procedure by using the target credential. In this case, there are the following two cases.

Case 1

The terminal device may perform the secondary authentication procedure in a process of performing a session management procedure. For example, the terminal device may initiate one of session management procedures such as a session establishment procedure and a session modification procedure. Assuming that the terminal device initiates the session establishment procedure, the terminal device may perform the secondary authentication procedure in a process of performing the session establishment procedure.

Case 2

The first core network device initiates one of session management procedures such as a session establishment procedure and a session modification procedure, so that the terminal device performs the secondary authentication procedure in a process of performing the session management procedure.

Based on the technical solution of the method 300, after obtaining the target credential and the attribute information of the target credential, the first core network device sends the target credential to the terminal device, and triggers, based on the attribute information of the target credential, the terminal device to perform, by using the obtained target credential, the authentication procedure corresponding to the target credential, so that the terminal device can learn of the specific authentication procedure that should be performed by using the obtained target credential.

The following describes in detail communication methods provided in this application with reference to FIG. 4 to FIG. 13. First, an example in which a first core network device is a UDM network element is used for description with reference to a method 400 in FIG. 4.

Step 401: A terminal device registers with a PLMN. For specific descriptions of step 401, refer to related descriptions in step 201. For brevity, details are not described herein again.

Step 402: A PVS sends a target credential and attribute information of the target credential to the UDM network element.

The attribute information that is of the target credential and that is sent by the PVS to the UDM network element may include first attribute information, and the first attribute information may indicate a type of the target credential.

For example, the PVS may send an Nudm_ParameterProvision_Create message or an Nudm_ParameterProvision_Update message to the UDM network element, where the Nudm_ParameterProvision_Create message or the Nudm_ParameterProvision_Update message may include the target credential and the attribute information of the target credential.

It should be noted that, in addition to sending the target credential and the attribute information of the target credential, the PVS may further send a subscription permanent identifier (SUPI) and/or a generic public subscription identifier (GPSI) to the UDM network element, where the SUPI may be obtained by mapping the GPSI.

For example, the PVS sends an Nudm_ParameterProvision_Create message or an Nudm_ParameterProvision_Update message to the UDM network element, where the Nudm_ParameterProvision_Create message or the Nudm_ParameterProvision_Update message may include the target credential, the attribute information of the target credential, and (the SUPI and/or the GPSI).

Step 403: The UDM network element sends the target credential and the attribute information of the target credential to an AMF network element.

After obtaining the target credential and the attribute information of the target credential from the PVS, the UDM network element does not perform any processing on the attribute information of the target credential, and only forwards the attribute information of the target credential. In other words, after obtaining the target credential and the attribute information of the target credential from the PVS, the UDM network element sends the target credential and the attribute information of the target credential to the AMF network element. For example, the UDM network element sends an Nudm_SDM_Notification message to the AMF network element, where the message may include the target credential and the attribute information of the target credential.

It should be noted that, in addition to sending the target credential and the attribute information of the target credential, the UDM network element may further send the SUPI and/or the GPSI to the AMF network element.

For example, the UDM network element sends an Nudm_SDM_Notification message to the AMF network element, where the Nudm_SDM_Notification message may include the target credential, the attribute information of the target credential, and (the SUPI and/or the GPSI).

Step 404: The AMF network element sends the target credential and the attribute information of the target credential to the terminal device.

After obtaining the target credential and the attribute information of the target credential from the UDM network element, the AMF network element may send the target credential and the attribute information of the target credential to the terminal device. For example, the AMF network element sends a NAS message to the terminal device, where the NAS message may include the target credential and the attribute information of the target credential.

Step 405: The terminal device obtains the attribute information of the target credential.

After receiving the target credential and the attribute information of the target credential from the AMF network element, the terminal device may obtain the attribute information of the target credential. The attribute information of the target credential includes the first attribute information.

Step 406: The terminal device performs, based on the attribute information of the target credential by using the target credential, an authentication procedure corresponding to the target credential.

The terminal device may determine the type of the target credential based on the first attribute information in the attribute information of the target credential, determine, based on the type of the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 400, after obtaining the target credential and the first attribute information, the PVS forwards the target credential and the first attribute information to the terminal device through the UDM network element and the AMF network element sequentially. The terminal device determines the type of the target credential based on the first attribute information, determines the authentication procedure corresponding to the target credential, and finally performs, by using the target credential, the authentication procedure corresponding to the target credential.

Figure 5:
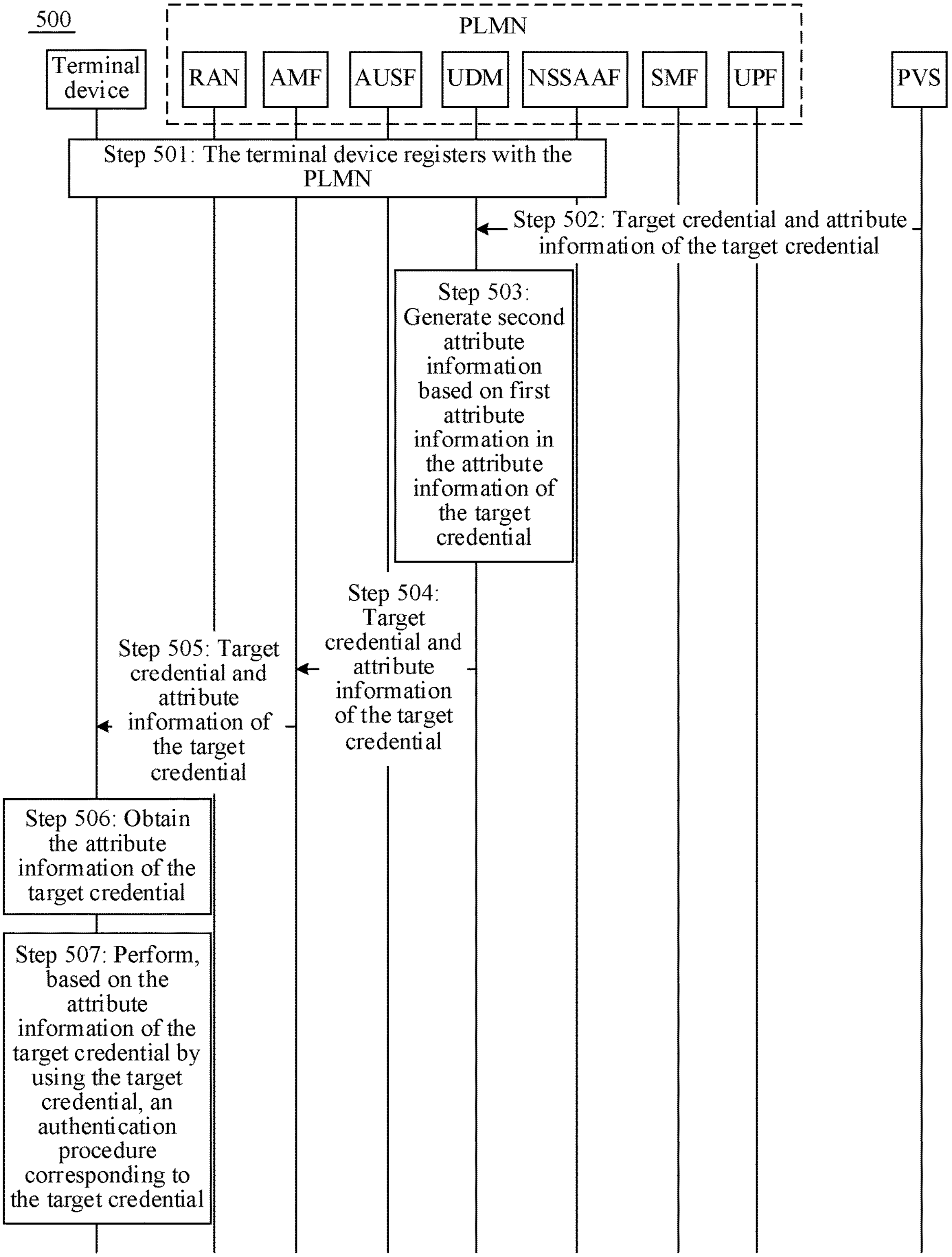
FIG. 5 is a schematic diagram of another example of a communication method according to an embodiment of this application.

An example in which a first core network device is a UDM network element is still used below for description with reference to a method 500 in FIG. 5.

Step 501: A terminal device registers with a PLMN. For specific descriptions of step 401, refer to related descriptions in step 201. For brevity, details are not described herein again.

Step 502: A PVS sends a target credential and attribute information of the target credential to the UDM network element. For specific descriptions of step 502, refer to related descriptions in step 402 in the method 400. For brevity, details are not described herein again.

Step 503: The UDM network element generates second attribute information based on first attribute information in the attribute information of the target credential.

After obtaining the target credential and the attribute information, of the target credential, including the first attribute information from the PVS, the UDM network element may determine a type of the target credential based on the first attribute information, and then determine, based on the type of the target credential, an authentication procedure corresponding to the target credential. In this case, the UDM network element may generate the second attribute information, and the second attribute information may indicate the authentication procedure corresponding to the target credential.

Step 504: The UDM network element sends the target credential and the attribute information of the target credential to an AMF network element.

The attribute information that is of the target credential and that is sent by the UDM network element to the AMF network element may include at least one of the first attribute information and the second attribute information. For example, the UDM network element sends an Nudm_SDM_Notification message to the AMF network element, where the message may include the target credential and the attribute information of the target credential.

It should be noted that, in addition to sending the target credential and the attribute information of the target credential, the UDM network element may further send a SUPI and/or a GPSI to the AMF network element.

For example, the UDM network element sends an Nudm_SDM_Notification message to the AMF network element, where the Nudm_SDM_Notification message may include the target credential, the attribute information of the target credential, and (the SUPI and/or the GPSI).

Step 505: The AMF network element sends the target credential and the attribute information of the target credential to the terminal device.

After receiving the target credential and the attribute information of the target credential from the UDM network element, the AMF network element may send the target credential and the attribute information of the target credential to the terminal device. For example, the AMF network element sends a NAS message to the terminal device, where the NAS message may include the target credential and the attribute information of the target credential, and the attribute information of the target credential includes at least one of the first attribute information and the second attribute information.

Step 506: The terminal device obtains the attribute information of the target credential.

After receiving the target credential and the attribute information of the target credential from the AMF network element, the terminal device may obtain the attribute information of the target credential. The attribute information of the target credential includes at least one of the first attribute information and the second attribute information.

Step 507: The terminal device performs, based on the attribute information of the target credential by using the target credential, the authentication procedure corresponding to the target credential.

After obtaining the target credential and the attribute information of the target credential from the AMF network element, the terminal device may determine, based on the attribute information of the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 500, after receiving the target credential and the first attribute information from the PVS, the UDM network element generates the second attribute information based on the first attribute information. The UDM network element forwards, through the AMF network element, the target credential and target attribute information including at least one of the first attribute information and the second attribute information to the terminal device. The terminal device determines, based on the attribute information of the target credential, at least one of the type of the target credential and the authentication procedure corresponding to the target credential, determines, based on at least one of the type of the target credential and the authentication procedure corresponding to the target credential, the authentication procedure corresponding to the target credential, and further performs, by using the target credential, the authentication procedure corresponding to the target credential.

Figure 6:
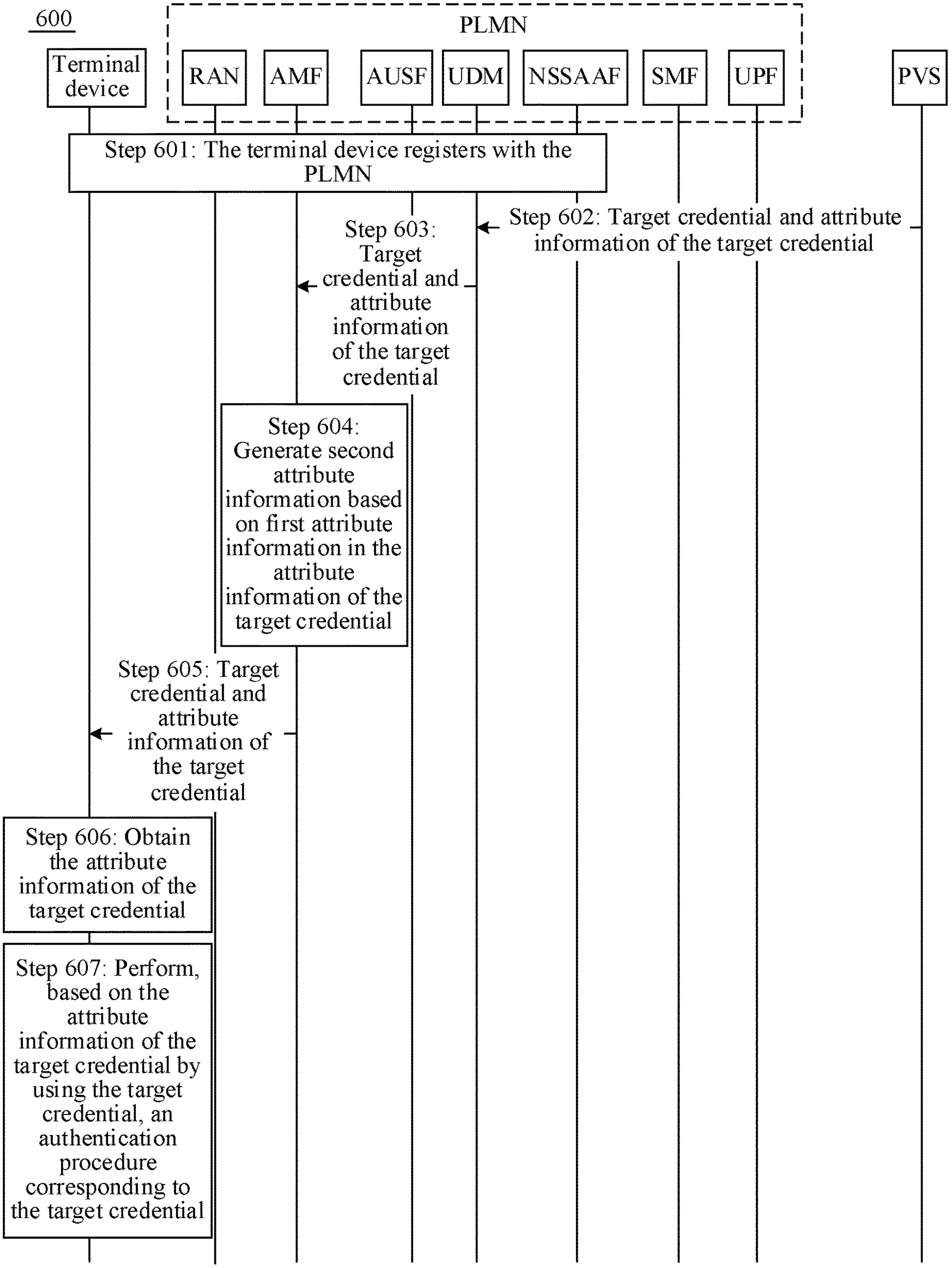
FIG. 6 is a schematic diagram of another example of a communication method according to an embodiment of this application.

An example in which a first core network device is an AMF network element and a second core network device is a UDM network element is used below for description with reference to a method 600 in FIG. 6.

Step 601: A terminal device registers with a PLMN. For specific descriptions of step 601, refer to related descriptions in step 201. For brevity, details are not described herein again.

Step 602: A PVS sends a target credential and attribute information of the target credential to the UDM network element. For specific descriptions of step 602, refer to related descriptions in step 402 in the method 400. For brevity, details are not described herein again.

Step 603: The UDM network element sends the target credential and the attribute information of the target credential to the AMF network element.

The attribute information that is of the target credential and that is sent by the UDM network element to the AMF network element may include first attribute information. For example, the UDM network element sends an Nudm_SDM_Notification message to the AMF network element, where the message may include the target credential and the attribute information of the target credential.

It should be noted that the UDM network element may further generate second attribute information based on the first attribute information, and send the target credential and the attribute information of the target credential to the AMF network element. The attribute information of the target credential includes at least one of the first attribute information and the second attribute information.

It should be noted that, in addition to sending the target credential and the attribute information of the target credential, the UDM network element may further send a SUPI and/or a GPSI to the AMF network element.

For example, the UDM network element sends an Nudm_SDM_Notification message to the AMF network element, where the Nudm_SDM_Notification message may include the target credential, the attribute information of the target credential, and (the SUPI and/or the GPSI).

Step 604: The AMF network element generates the second attribute information based on the first attribute information in the attribute information of the target credential.

After obtaining the target credential and the attribute information, of the target credential, including the first attribute information from the UDM network element, the AMF network element may determine a type of the target credential based on the first attribute information, and then determine, based on the type of the target credential, an authentication procedure corresponding to the target credential. In this case, the AMF network element may generate the second attribute information, and the second attribute information may indicate the authentication procedure corresponding to the target credential.

It should be noted that after receiving the target credential and the attribute information, of the target credential, including the first attribute information from the UDM network element, the AMF network element may not perform any processing on the attribute information of the target credential, and only forwards the attribute information of the target credential. In other words, after receiving the target credential and the attribute information of the target credential from the UDM, the AMF network element forwards the target credential and the attribute information of the target credential to the terminal device.

Step 605: The AMF network element sends the target credential and the attribute information of the target credential to the terminal device.

After generating the second attribute information, the AMF network element may send the target credential and the attribute information of the target credential to the terminal device. For example, the AMF network element sends a NAS message to the terminal device, where the NAS message may include the target credential and the attribute information of the target credential, and the attribute information of the target credential includes at least one of the first attribute information and the second attribute information.

Step 606: The terminal device obtains the attribute information of the target credential.

After obtaining the target credential and the attribute information of the target credential from the AMF network element, the terminal device may obtain the attribute information of the target credential. The attribute information of the target credential includes at least one of the first attribute information and the second attribute information.

Step 607: The terminal device performs, based on the attribute information of the target credential by using the target credential, the authentication procedure corresponding to the target credential.

After obtaining the target credential and the attribute information of the target credential from the AMF network element, the terminal device may determine, based on the attribute information of the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 600, after receiving the target credential and the first attribute information from the PVS, the UDM network element forwards the target credential and the first attribute information to the AMF network element. The AMF network element generates the second attribute information based on the first attribute information. The AMF network element forwards the target credential and target attribute information including at least one of the first attribute information and the second attribute information to the terminal device. The terminal device determines, based on the attribute information of the target credential, at least one of the type of the target credential and the authentication procedure corresponding to the target credential, determines, based on at least one of the type of the target credential and the authentication procedure corresponding to the target credential, the authentication procedure corresponding to the target credential, and further performs, by using the target credential, the authentication procedure corresponding to the target credential.

Figure 7:
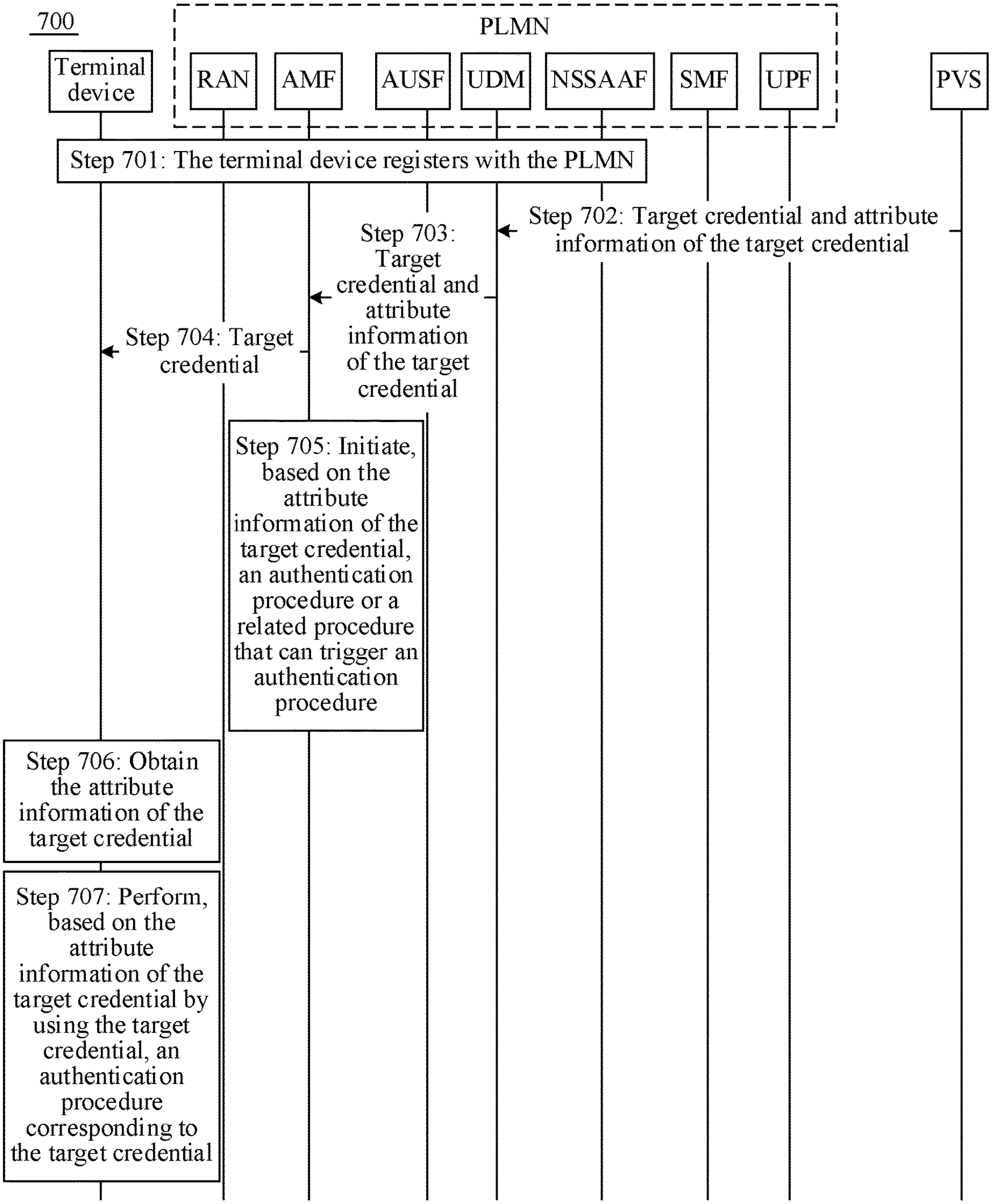
FIG. 7 is a schematic diagram of another example of a communication method according to an embodiment of this application.

An example in which a first core network device is an AMF network element and a second core network device is a UDM network element is still used below for description with reference to a method 700 in FIG. 7.

Step 701: A terminal device registers with a PLMN. For specific descriptions of step 701, refer to related descriptions in step 201. For brevity, details are not described herein again.

Step 702: A PVS sends a target credential and attribute information of the target credential to the UDM network element. For specific descriptions of step 702, refer to related descriptions in step 402 in the method 400. For brevity, details are not described herein again.

Step 703: The UDM network element sends the target credential and the attribute information of the target credential to the AMF network element.

The attribute information that is of the target credential and that is sent by the UDM network element to the AMF network element may include first attribute information. For example, the UDM network element sends an Nudm_SDM_Notification message to the AMF network element, where the message may include the target credential and the attribute information of the target credential.

It should be noted that the UDM network element may further generate second attribute information based on the first attribute information, and send the target credential and the attribute information of the target credential to the terminal device. The attribute information of the target credential includes at least one of the first attribute information and the second attribute information.

It should be noted that, in addition to sending the target credential and the attribute information of the target credential, the UDM network element may further send a SUPI to the AMF network element.

For example, the UDM network element sends an Nudm_SDM_Notification message to the AMF network element, where the Nudm_SDM_Notification message may include the target credential, the attribute information of the target credential, and (the SUPI and/or a GPSI).

Step 704: The AMF network element sends the target credential to the terminal device.

After receiving the target credential and the attribute information, of the target credential, including the first attribute information from the UDM, the AMF network element may determine a type of the target credential based on the first attribute information, and then determine, based on the type of the target credential, an authentication procedure corresponding to the target credential. In this case, the AMF network element may send the target credential to the terminal device.

It should be noted that, in addition to sending the target credential to the terminal device, the AMF network element may further send the attribute information, of the target credential, including the first attribute information to the terminal device. In addition, the AMF network element may further generate the second attribute information based on the first attribute information, and send the target credential and the attribute information of the target credential to the terminal device. The attribute information of the target credential includes at least one of the first attribute information and the second attribute information.

Step 705: The AMF network element initiates, based on the attribute information of the target credential, an authentication procedure or a related procedure that can trigger an authentication procedure. For specific descriptions of step 705, refer to related descriptions in step 303 in the method 300. For brevity, details are not described herein again.

Step 706: The terminal device obtains the attribute information of the target credential. For specific descriptions of step 706, refer to related descriptions in step 304 in the method 300. For brevity, details are not described herein again.

Step 707: The terminal device performs, based on the attribute information of the target credential by using the target credential, the authentication procedure corresponding to the target credential.

After obtaining the target credential and the attribute information of the target credential from the AMF network element, the terminal device may determine, based on the attribute information of the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 700, after receiving the target credential and the first attribute information from the PVS, the UDM network element forwards the target credential and the first attribute information to the AMF network element. The AMF network element determines the type of the target credential based on the first attribute information, and then determines the authentication procedure corresponding to the target credential. In this case, the AMF network element may send only the target credential to the terminal device, and initiate the authentication procedure or the related procedure that can trigger the authentication procedure. When the terminal device senses the authentication procedure or the related procedure that can trigger the authentication procedure, the terminal device may learn of the authentication procedure corresponding to the received target credential, and finally perform, by using the target credential, the authentication procedure corresponding to the target credential.

For example, the AMF network element initiates a deregistration procedure that can trigger a slice authentication procedure. After sensing the deregistration procedure, the terminal device may learn that the type of the recently received target credential is a credential used to perform slice authentication, so that the terminal device may perform the slice authentication procedure by using the target credential in a process of performing a registration procedure.

Figure 8:
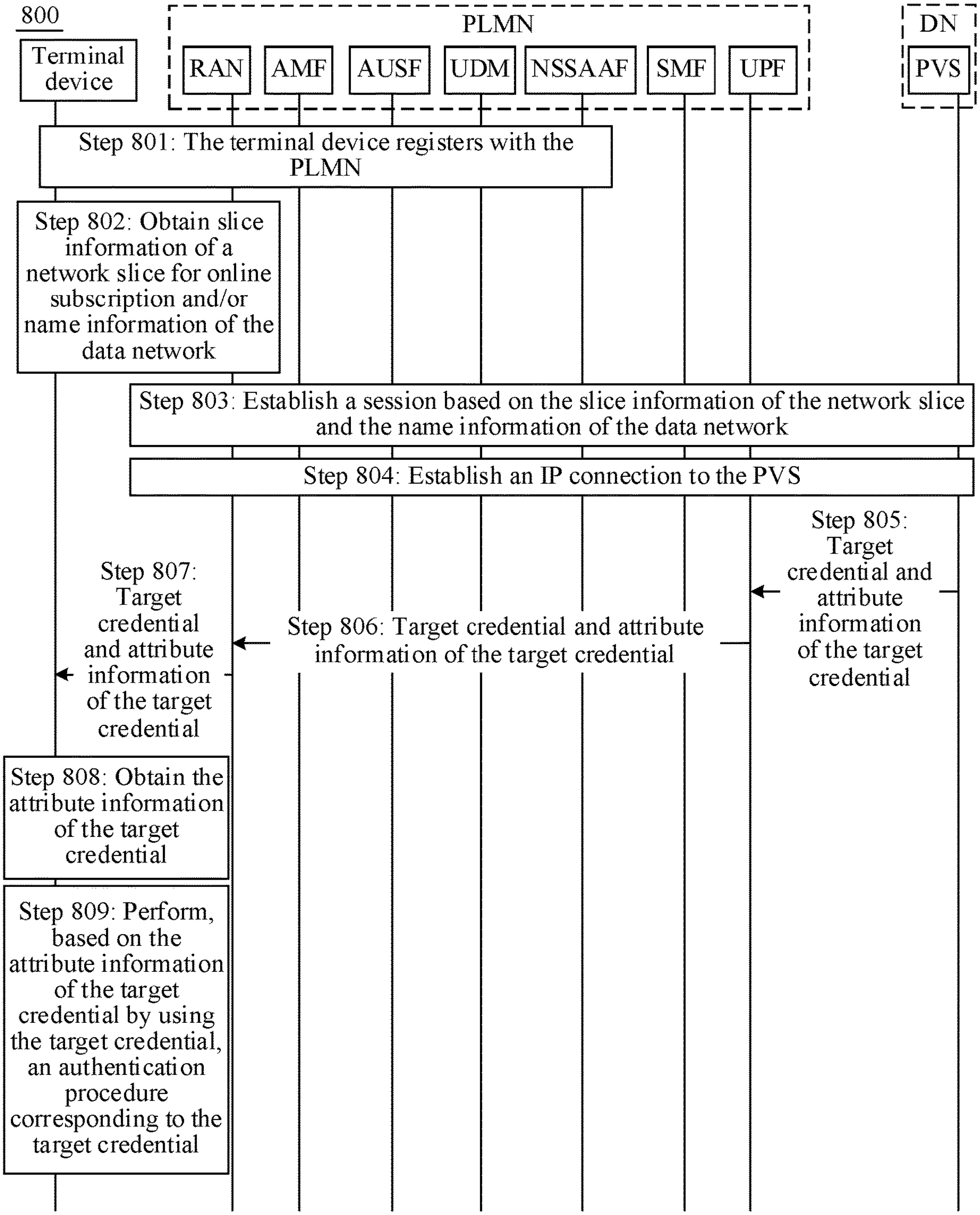
FIG. 8 is a schematic diagram of another example of a communication method according to an embodiment of this application.

An example in which a first core network device is a UPF network element is used below for description with reference to a method 800 in FIG. 8.

Step 801: A terminal device registers with a PLMN. For specific descriptions of step 801, refer to related descriptions in step 201. For brevity, details are not described herein again.

Step 802: The terminal device obtains slice information of a network slice for online subscription and/or name information of a data network. For specific descriptions of step 801, refer to related descriptions in step 202. For brevity, details are not described herein again.

Step 803: The terminal device establishes a session based on the slice information of the network slice and the name information of the data network. For specific descriptions of step 803, refer to related descriptions in step 203. For brevity, details are not described herein again.

Step 804: The terminal device establishes an IP connection to a PVS. For specific descriptions of step 804, refer to related descriptions in step 204. For brevity, details are not described herein again.

Step 805: The PVS sends a target credential and attribute information of the target credential to the UPF network element.

For example, the PVS sends user plane data to the UPF network element, where the user plane data includes the target credential and the attribute information of the target credential, and the attribute information of the target credential includes first attribute information.

Step 806: The UPF network element sends the target credential and the attribute information of the target credential to a RAN.

For example, the PVS sends the user plane data to the UPF network element, where the user plane data includes the target credential and the attribute information of the target credential.

Step 807: The RAN sends the target credential and the attribute information of the target credential to the terminal device.

Step 808: The terminal device obtains the attribute information of the target credential.

After receiving the target credential and the attribute information of the target credential, the terminal device may obtain the attribute information of the target credential.

Step 809: The terminal device performs, based on the attribute information of the target credential by using the target credential, an authentication procedure corresponding to the target credential.

The terminal device may determine a type of the target credential based on the first attribute information in the attribute information of the target credential, determine, based on the type of the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 800, after obtaining the target credential and the first attribute information, the PVS forwards the target credential and the first attribute information to the terminal device through the UPF network element and the RAN sequentially. The terminal device determines the type of the target credential based on the first attribute information, determines the authentication procedure corresponding to the target credential, and finally performs, by using the target credential, the authentication procedure corresponding to the target credential.

In this application, there may be the following two cases of a relationship between the first attribute information and the target credential.

Case 1

The first attribute information in the attribute information of the target credential is information independent of the target credential.

Case 2

The first attribute information in the attribute information of the target credential is carried in the target credential. In other words, the target credential is modified, so that a modified target credential carries the first attribute information.

The method 300 to the method 800 are proposed based on the following two assumptions.

Assumption 1: The first attribute information in the attribute information of the target credential may be information independent of the target credential.

Assumption 2: After obtaining or generating the target credential and the attribute information of the target credential, the PVS may directly send the target credential and the attribute information of the target credential.

The following further describes, based on the following other two assumptions, the communication methods provided in this application.

Assumption 1: The first attribute information in the attribute information of the target credential is carried in the target credential.

Assumption 2: The PVS sends the target credential and the attribute information of the target credential only when status information of the terminal device meets a preset condition.

Figure 9:
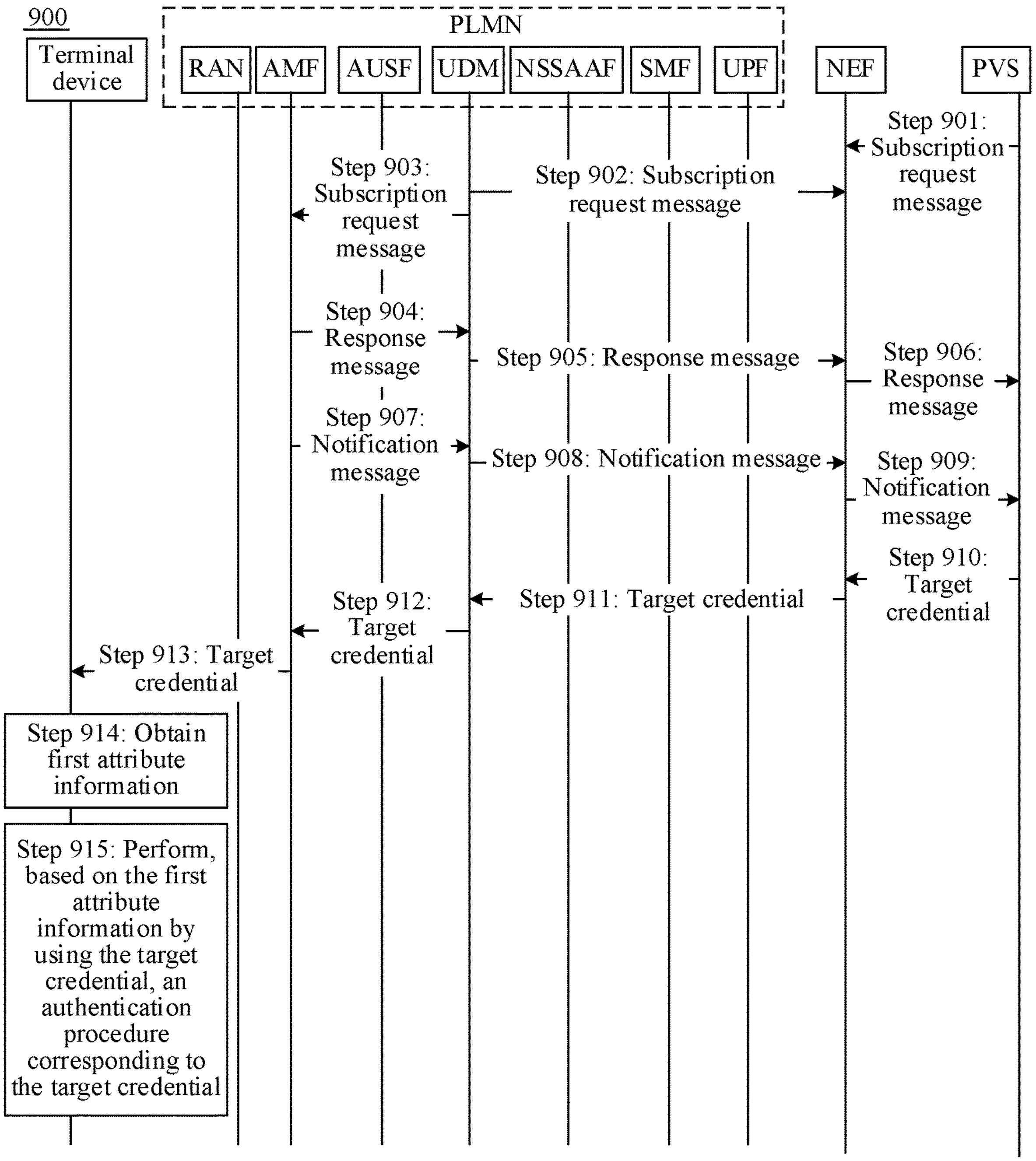
FIG. 9 is a schematic diagram of another example of a communication method according to an embodiment of this application.

First, an example in which a first core network device is a UDM network element is used for description with reference to a method 900 in FIG. 9.

Step 901: A PVS sends a subscription request message to an NEF network element.

For example, the PVS sends an Nnef_EventExposure_Subscribe request message to the NEF network element, where the Nnef_EventExposure_Subscribe request message includes a GPSI and an event identifier, the event identifier indicates an event corresponding to registration state information of a terminal device or location information of the terminal device, and the message indicates that the PVS requests, from the NEF network element, to subscribe to the registration state information or the location information of the terminal device corresponding to the GPSI.

Step 902: The NEF network element sends a subscription request message to the UDM network element.

For example, the NEF network element sends an Nudm_EventExposure_Subscribe request message to the UDM network element, where the message includes a SUPI and the event identifier, and indicates that the NEF network element requests, from the UDM network element, to subscribe to the registration state information or the location information of the terminal device corresponding to the SUPI, and the SUPI is obtained by mapping the GPSI by the NEF network element.

Step 903: The UDM network element sends a subscription request message to an AMF network element.

For example, the UDM network element sends an Namf_EventExposure_Subscribe request message to the AMF network element, where the message includes the SUPI and the event identifier, and indicates that the UDM network element requests, from the AMF network element, to subscribe to the registration state information or the location information of the terminal device corresponding to the SUPI.

Step 904: The AMF network element sends a response message to the UDM network element.

For example, the AMF network element sends an Namf_EventExposure_Subscribe response message to the UDM network element, where the message indicates that the AMF network element has accepted subscription of the UDM network element.

Step 905: The UDM network element sends a response message to the NEF network element.

For example, the UDM network element sends an Nudm_EventExposure_Subscribe response message to the NEF network element, where the message indicates that the UDM network element has accepted subscription of the NEF network element.

Step 906: The NEF network element sends a response message to the PVS.

For example, the NEF network element sends an Nnef_EventExposure_Subscribe response message to the PVS, where the message indicates that the NEF network element has accepted subscription of the PVS network element.

Step 907: When a current location of the terminal device or a registration status of the terminal device changes, the AMF network element sends a notification message to the UDM network element.

For example, when the terminal device registers with a PLMN, re-registers with the PLMN, or deregisters from the PLMN, it indicates that the registration status of the terminal device changes. In this case, the AMF network element may send the notification message to the UDM network element. For example, the AMF network element may send an Namf_EventExposure_Notify message to the UDM network element, where the message includes an identifier of the AMF network element, the event identifier, event-related information, and an identifier of the terminal device, the event identifier indicates the event corresponding to the registration state information of the terminal device, and the event-related information may be the registration state information of the terminal device. For example, the registration state information may indicate that the terminal device is in a PLMN-registered state, a PLMN-re-registered state, or a PLMN-deregistered state, and the identifier of the terminal device may be the SUPI or the GPSI.

For example, when the current location of the terminal device changes, the AMF network element may send the notification message to the UDM network element. For example, the AMF network element may send an Namf_EventExposure_Notify message to the UDM network element, where the message includes the identifier of the AMF network element, the event identifier, event-related information, and the identifier of the terminal device, the event identifier indicates the event corresponding to the location information of the terminal device, and the event-related information may be the location information of the terminal device. For example, the location information may indicate the current location of the terminal device, or indicate whether the terminal device is currently in a tracking area (for example, a target tracking area) or a cell (for example, a target cell) in which an NPN service can be provided, and the identifier of the terminal device may be the SUPI or the GPSI.

It should be noted that the UDM network element may alternatively learn of whether the registration status of the terminal device changes. In this case, the UDM network element may determine, without depending on the notification message from the AMF network element, whether the registration status of the terminal device changes.

Step 908: The UDM network element sends a notification message to the NEF network element.

For example, the UDM network element sends an Nudm_EventExposure_Notify message to the NEF network element, where the message includes the event identifier and the event-related information.

Step 909: The NEF network element sends a notification message to the PVS.

For example, the NEF network element sends an Nnef_EventExposure_Notify message to the PVS, where the message includes the event identifier and the event-related information.

Step 910: When the registration state information of the terminal device or the location information of the terminal device meets a preset condition, the PVS sends a target credential to the NEF network element. It should be noted that a moment at which the terminal device registers with the PLMN is not limited in this application. In other words, the terminal device may register with the PLMN at any moment after the terminal device expects to obtain the NPN service. Before the terminal device completes PLMN registration, the target credential is temporarily buffered. After the terminal device completes PLMN registration, the target credential is sent to the terminal device.

For example, the notification message from the NEF network element indicates that the current location of the terminal device is in the tracking area in which the NPN service can be provided. In this case, the PVS sends the target credential to the NEF network element, where the target credential carries first attribute information.

For example, the PVS sends an Nnef_ParameterProvision_Create message or an Nnef_ParameterProvision_Update message to the NEF network element, where the Nnef_ParameterProvision_Create message or the Nnef_ParameterProvision_Update message may include the target credential and the GPSI.

Step **9*n***: The NEF network element sends the target credential to the UDM network element.

After obtaining the target credential and the GPSI from the PVS, the NEF network element may map the GPSI to generate the SUPI, and send the target credential and the SUPI to the UDM network element.

For example, the NEF network element sends an Nudm_ParameterProvision_Create message or an Nudm_ParameterProvision_Update message to the UDM network element, where the Nudm_ParameterProvision_Create message or the Nudm_ParameterProvision_Update message may include the target credential and the SUPI. It should be noted that, in step 910, if the PVS sends the Nnef_ParameterProvision_Create message to the NEF network element, the NEF network element sends the Nudm_ParameterProvision_Create message to the UDM network element. If the PVS sends the Nnef_ParameterProvision_Update message to the NEF network element, the NEF network element sends the Nudm_ParameterProvision_Update message to the UDM network element.

Step 912: The UDM network element sends the target credential to the AMF network element.

After obtaining the target credential from the PVS, the UDM network element does not perform any processing on the first attribute information, and only forwards the first attribute information. In other words, after obtaining the target credential from the PVS, the UDM network element sends the target credential to the AMF network element. For example, the UDM network element sends an Nudm_SDM_Notification message to the AMF network element, where the message may include the target credential and the SUPI.

Step 913: The AMF network element sends the target credential to the terminal device.

After receiving the target credential from the UDM network element, the AMF network element may send the target credential to the terminal device. For example, the AMF network element sends a NAS message to the terminal device, where the NAS message may include the target credential.

Step 914: The terminal device obtains the first attribute information.

After receiving the target credential from the AMF network element, the terminal device may obtain the first attribute information from the target credential.

Step 915: The terminal device performs, based on the first attribute information by using the target credential, an authentication procedure corresponding to the target credential.

The terminal device may determine a type of the target credential based on the first attribute information, determine, based on the type of the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 900, the PVS obtains status information of the terminal device, and the PVS forwards, to the terminal device through the UDM network element and the AMF network element sequentially, the target credential that carries the first attribute information only when the status information of the terminal device meets the preset condition, to optimize a mechanism in which the service provision server delivers the target credential and attribute information of the target credential.

In addition, the terminal device determines the type of the target credential based on the first attribute information, then determines the authentication procedure corresponding to the target credential, and finally performs, by using the target credential, the authentication procedure corresponding to the target credential.

Figure 10:
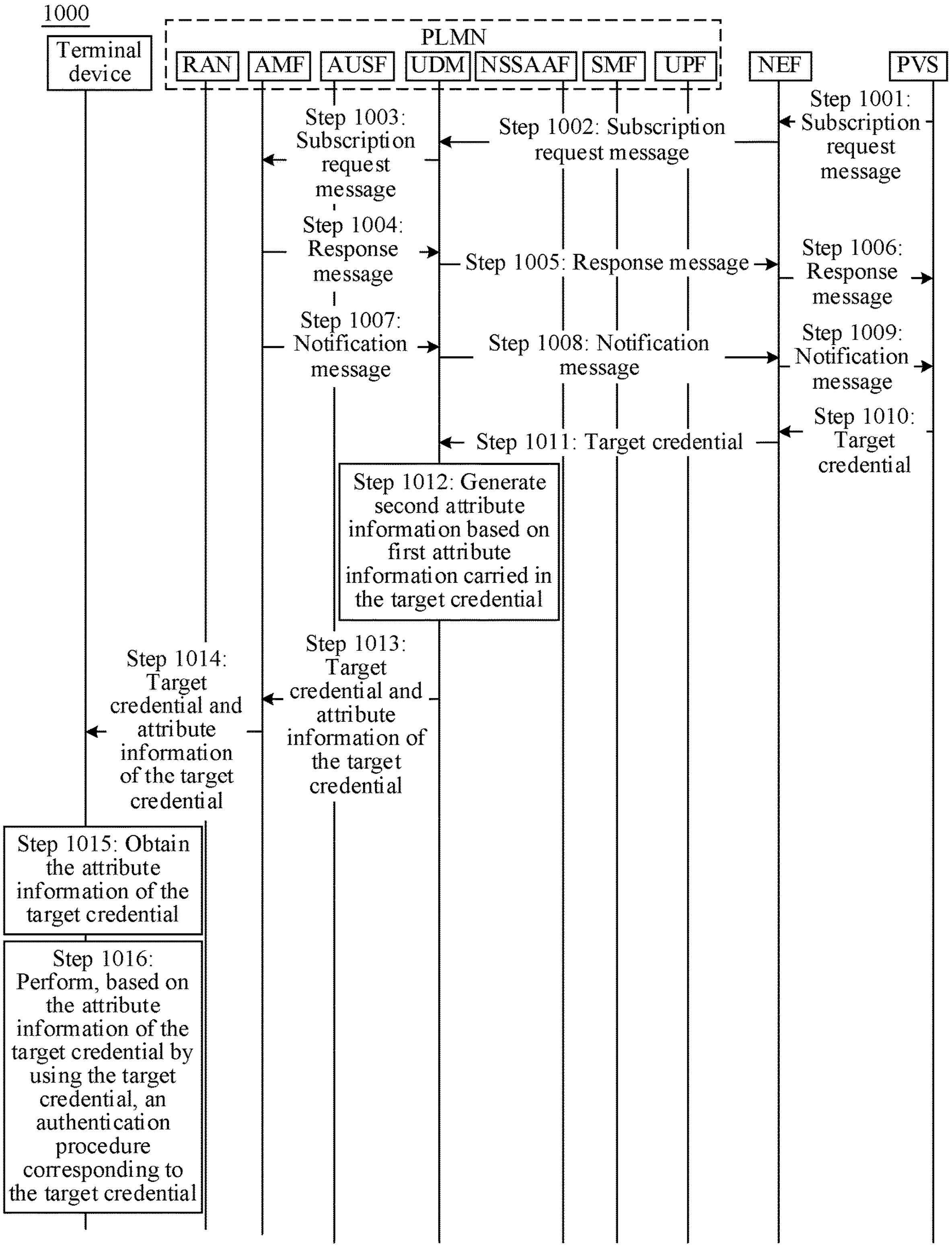
FIG. 10 is a schematic diagram of another example of a communication method according to an embodiment of this application.

An example in which a first core network device is a UDM network element is still used below for description with reference to a method woo in FIG. 10.

Step loot A PVS sends a subscription request message to an NEF network element. For specific descriptions of step 1001, refer to related descriptions in step 901 in the method 900. For brevity, details are not described herein again.

Step 1002: The NEF network element sends a subscription request message to the UDM network element. For specific descriptions of step 1002, refer to related descriptions in step 902 in the method 900. For brevity, details are not described herein again.

Step 1003: The UDM network element sends a subscription request message to an AMF network element. For specific descriptions of step 1003, refer to related descriptions in step 903 in the method 900. For brevity, details are not described herein again.

Step 1004: The AMF network element sends a response message to the UDM network element. For specific descriptions of step 1004, refer to related descriptions in step 904 in the method 900. For brevity, details are not described herein again.

Step 1005: The UDM network element sends a response message to the NEF network element. For specific descriptions of step 1005, refer to related descriptions in step 905 in the method 900. For brevity, details are not described herein again.

Step 1006: The NEF network element sends a response message to the PVS. For specific descriptions of step 1006, refer to related descriptions in step 906 in the method 900. For brevity, details are not described herein again.

Step 1007: When a current location of a terminal device or a registration status of the terminal device changes, the AMF network element sends a notification message to the UDM network element. For specific descriptions of step 1007, refer to related descriptions in step 907 in the method 900. For brevity, details are not described herein again.

Step 1008: The UDM network element sends a notification message to the NEF network element. For specific descriptions of step 1008, refer to related descriptions in step 908 in the method 900. For brevity, details are not described herein again.

Step 1009: The NEF network element sends a notification message to the PVS. For specific descriptions of step 1009, refer to related descriptions in step 909 in the method 900. For brevity, details are not described herein again.

Step 1010: When registration state information of the terminal device or location information of the terminal device meets a preset condition, after the terminal device registers with a PLMN, the PVS sends a target credential to the NEF network element. It should be noted that a moment at which the terminal device registers with the PLMN is not limited in this application. In other words, the terminal device may register with the PLMN at any moment after the terminal device expects to obtain an NPN service. Before the terminal device completes PLMN registration, the target credential is temporarily buffered. After the terminal device completes PLMN registration, the target credential is sent to the terminal device. For specific descriptions of step 1010, refer to related descriptions in step 910 in the method 900. For brevity, details are not described herein again.

Step loll: The NEF network element sends the target credential to the UDM network element. For specific descriptions of step loll, refer to related descriptions in step 911 in the method 900. For brevity, details are not described herein again.

Step 1012: The UDM network element generates second attribute information based on first attribute information carried in the target credential.

After receiving the target credential from the NEF network element, the UDM network element may determine a type of the target credential based on the first attribute information carried in the target credential, and then determine, based on the type of the target credential, an authentication procedure corresponding to the target credential. In this case, the UDM network element may generate the second attribute information, and the second attribute information may indicate the authentication procedure corresponding to the target credential.

Step 1013: The UDM network element sends the target credential and attribute information of the target credential to the AMF network element.

The attribute information that is of the target credential and that is sent by the UDM network element to the AMF network element may include at least one of the first attribute information and the second attribute information. For example, the UDM network element sends an Nudm_SDM_Notification message to the AMF network element, where the message may include the target credential, the attribute information of the target credential, and a SUPI.

Step 1014: The AMF network element sends the target credential and the attribute information of the target credential to the terminal device.

After receiving the target credential and the attribute information of the target credential from the UDM network element, the AMF network element may send the target credential and the attribute information of the target credential to the terminal device. For example, the AMF network element sends a NAS message to the terminal device, where the NAS message may include the target credential and the attribute information of the target credential, and the attribute information of the target credential includes at least one of the first attribute information and the second attribute information.

Step 1015: The terminal device obtains the attribute information of the target credential.

After receiving the target credential and the attribute information of the target credential from the AMF network element, the terminal device may obtain the attribute information of the target credential. The attribute information of the target credential includes at least one of the first attribute information and the second attribute information.

Step 1016: The terminal device performs, based on the attribute information of the target credential by using the target credential, the authentication procedure corresponding to the target credential.

After receiving the target credential and the attribute information of the target credential from the AMF network element, the terminal device may determine, based on the attribute information of the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method woo, the PVS obtains status information of the terminal device, and the PVS forwards, to the terminal device through the UDM network element and the AMF network element sequentially, the target credential that carries the first attribute information only when the status information of the terminal device meets the preset condition, to optimize a mechanism in which the service provision server delivers the target credential and the attribute information of the target credential.

In addition, after receiving the target credential and the first attribute information from the PVS, the UDM network element generates the second attribute information based on the first attribute information. The UDM network element forwards, through the AMF network element, the target credential and target attribute information including at least one of the first attribute information and the second attribute information to the terminal device. The terminal device determines, based on the attribute information of the target credential, at least one of the type of the target credential and the authentication procedure corresponding to the target credential, determines, based on at least one of the type of the target credential and the authentication procedure corresponding to the target credential, the authentication procedure corresponding to the target credential, and further performs, by using the target credential, the authentication procedure corresponding to the target credential.

Figure 11A:
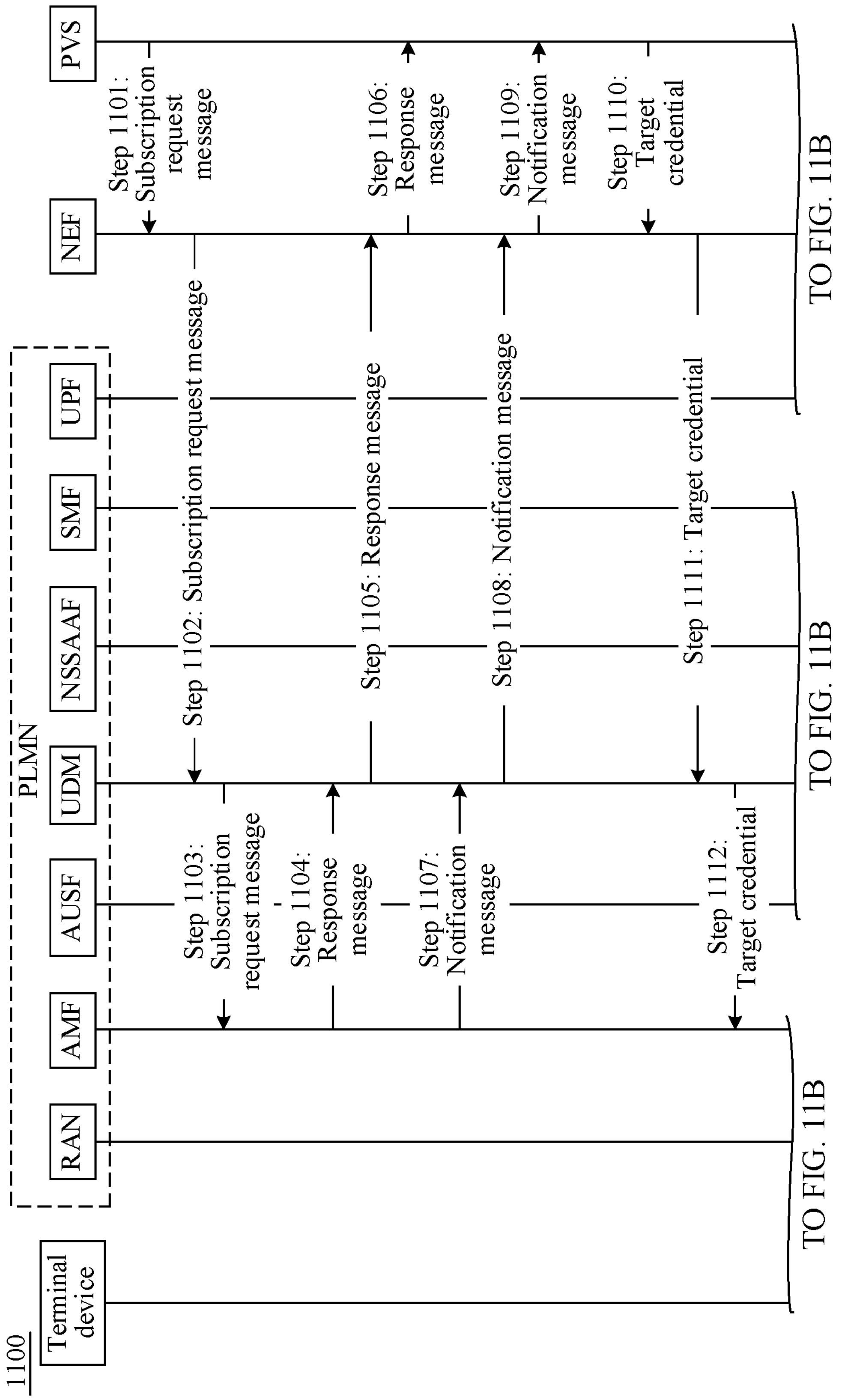
FIG. 11A and FIG. 11B are a schematic diagram of another example of a communication method according to an embodiment of this application.
Figure 11B:
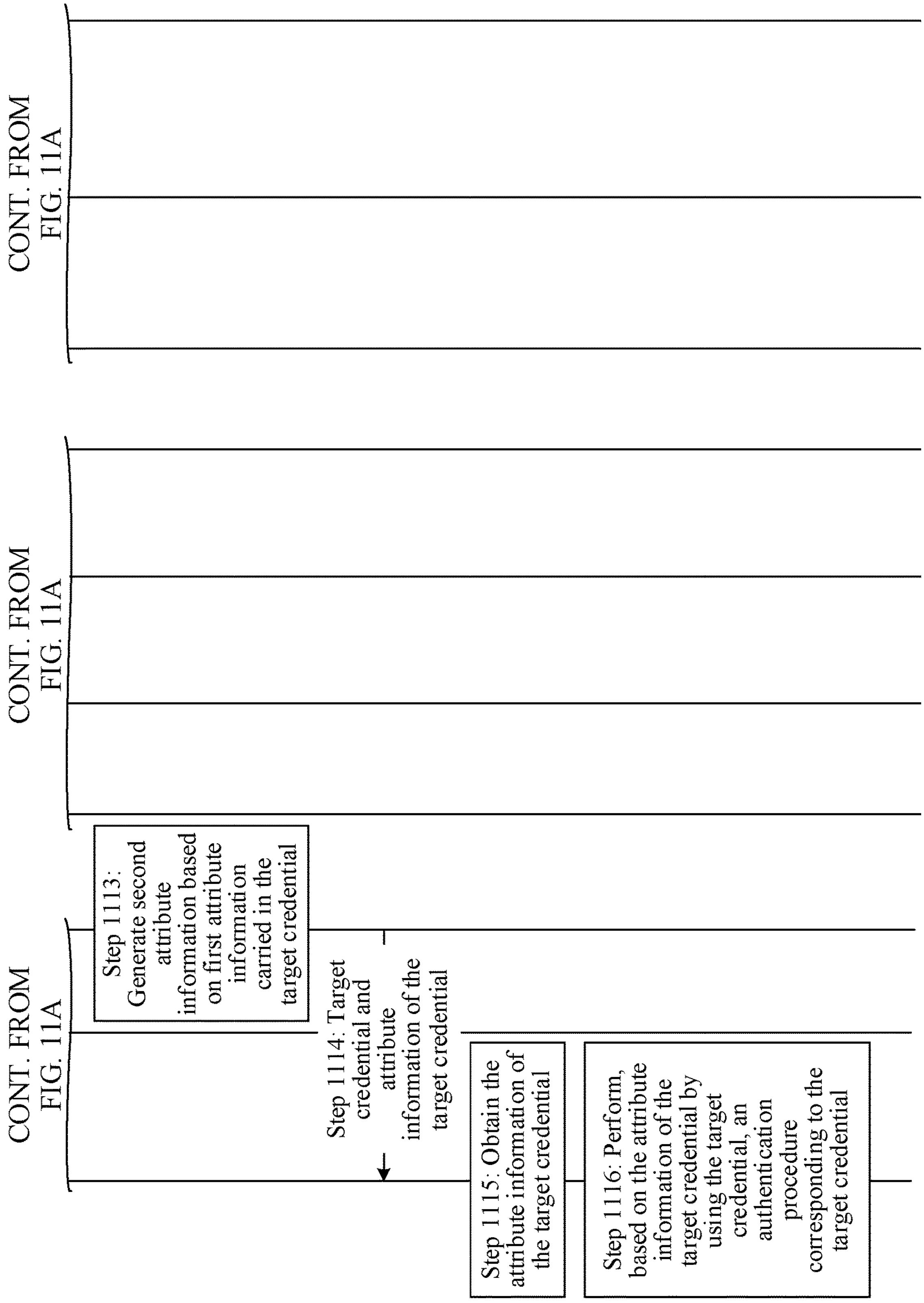

An example in which a first core network device is an AMF network element and a second core network device is a UDM network element is used below for description with reference to a method 1100 in FIG. 11A and FIG. 11B.

Step 1101: A PVS sends a subscription request message to an NEF network element. For specific descriptions of step 1101, refer to related descriptions in step 901 in the method 900. For brevity, details are not described herein again.

Step 1102: The NEF network element sends a subscription request message to the UDM network element. For specific descriptions of step 1102, refer to related descriptions in step 902 in the method 900. For brevity, details are not described herein again.

Step 1103: The UDM network element sends a subscription request message to the AMF network element. For specific descriptions of step 1103, refer to related descriptions in step 903 in the method 900. For brevity, details are not described herein again.

Step 1104: The AMF network element sends a response message to the UDM network element. For specific descriptions of step 1104, refer to related descriptions in step 904 in the method 900. For brevity, details are not described herein again.

Step 1105: The UDM network element sends a response message to the NEF network element. For specific descriptions of step 1105, refer to related descriptions in step 905 in the method 900. For brevity, details are not described herein again.

Step 1106: The NEF network element sends a response message to the PVS. For specific descriptions of step 1106, refer to related descriptions in step 906 in the method 900. For brevity, details are not described herein again.

Step 1107: When a current location of a terminal device or a registration status of the terminal device changes, the AMF network element sends a notification message to the UDM network element. For specific descriptions of step 1107, refer to related descriptions in step 907 in the method 900. For brevity, details are not described herein again.

Step 1108: The UDM network element sends a notification message to the NEF network element. For specific descriptions of step 1108, refer to related descriptions in step 908 in the method 900. For brevity, details are not described herein again.

Step 1109: The NEF network element sends a notification message to the PVS. For specific descriptions of step 1109, refer to related descriptions in step 909 in the method 900. For brevity, details are not described herein again.

Step 1110: When registration state information of the terminal device or location information of the terminal device meets a preset condition, after the terminal device registers with a PLMN, the PVS sends a target credential to the NEF network element. It should be noted that a moment at which the terminal device registers with the PLMN is not limited in this application. In other words, the terminal device may register with the PLMN at any moment after the terminal device expects to obtain an NPN service. Before the terminal device completes PLMN registration, the target credential is temporarily buffered. After the terminal device completes PLMN registration, the target credential is sent to the terminal device. For specific descriptions of step 1110, refer to related descriptions in step 910 in the method 900. For brevity, details are not described herein again.

Step 1111: The NEF network element sends the target credential to the UDM network element. For specific descriptions of step 1111, refer to related descriptions in step 911 in the method 900. For brevity, details are not described herein again.

Step 1112: The UDM network element sends the target credential to the AMF network element.

For example, the UDM network element sends an Nudm_SDM_Notification message to the AMF network element, where the message may include the target credential and a SUPI.

It should be noted that the UDM network element may further generate second attribute information based on first attribute information carried in the target credential, and send the target credential and attribute information of the target credential to the AMF network element. The attribute information of the target credential includes at least one of the first attribute information and the second attribute information.

Step 1113: The AMF network element generates the second attribute information based on the first attribute information carried in the target credential.

After receiving the target credential from the UDM network element, the AMF network element may determine a type of the target credential based on the first attribute information, and then determine, based on the type of the target credential, an authentication procedure corresponding to the target credential. In this case, the AMF network element may generate the second attribute information, and the second attribute information may indicate the authentication procedure corresponding to the target credential.

It should be noted that after receiving the target credential from the UDM network element, the AMF network element may not perform any processing on the attribute information of the target credential, and only forwards the attribute information of the target credential. In other words, the AMF network element obtains the target credential from the UDM, and forwards the target credential to the terminal device.

Step 1114: The AMF network element sends the target credential and the attribute information of the target credential to the terminal device.

After generating the second attribute information, the AMF network element may send the target credential and the attribute information of the target credential to the terminal device. For example, the AMF network element sends a NAS message to the terminal device, where the NAS message may include the target credential and the attribute information of the target credential, and the attribute information of the target credential includes at least one of the first attribute information and the second attribute information.

Step 1115: The terminal device obtains the attribute information of the target credential.

After receiving the target credential and the attribute information of the target credential from the AMF network element, the terminal device may obtain the attribute information of the target credential. The attribute information of the target credential includes at least one of the first attribute information and the second attribute information.

Step 1116: The terminal device performs, based on the attribute information of the target credential by using the target credential, the authentication procedure corresponding to the target credential.

After receiving the target credential and the attribute information of the target credential from the AMF network element, the terminal device may determine, based on the attribute information of the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 1100, the PVS obtains status information of the terminal device, and the PVS forwards, to the terminal device through the UDM network element and the AMF network element sequentially, the target credential that carries the first attribute information only when the status information of the terminal device meets the preset condition, to optimize a mechanism in which the service provision server delivers the target credential and the attribute information of the target credential.

In addition, after receiving the target credential and the first attribute information from the PVS, the UDM network element forwards the target credential and the first attribute information to the AMF network element. The AMF network element generates the second attribute information based on the first attribute information. The AMF network element forwards the target credential and target attribute information including at least one of the first attribute information and the second attribute information to the terminal device. The terminal device determines, based on the attribute information of the target credential, at least one of the type of the target credential and the authentication procedure corresponding to the target credential, determines, based on at least one of the type of the target credential and the authentication procedure corresponding to the target credential, the authentication procedure corresponding to the target credential, and further performs, by using the target credential, the authentication procedure corresponding to the target credential.

Figure 12A:
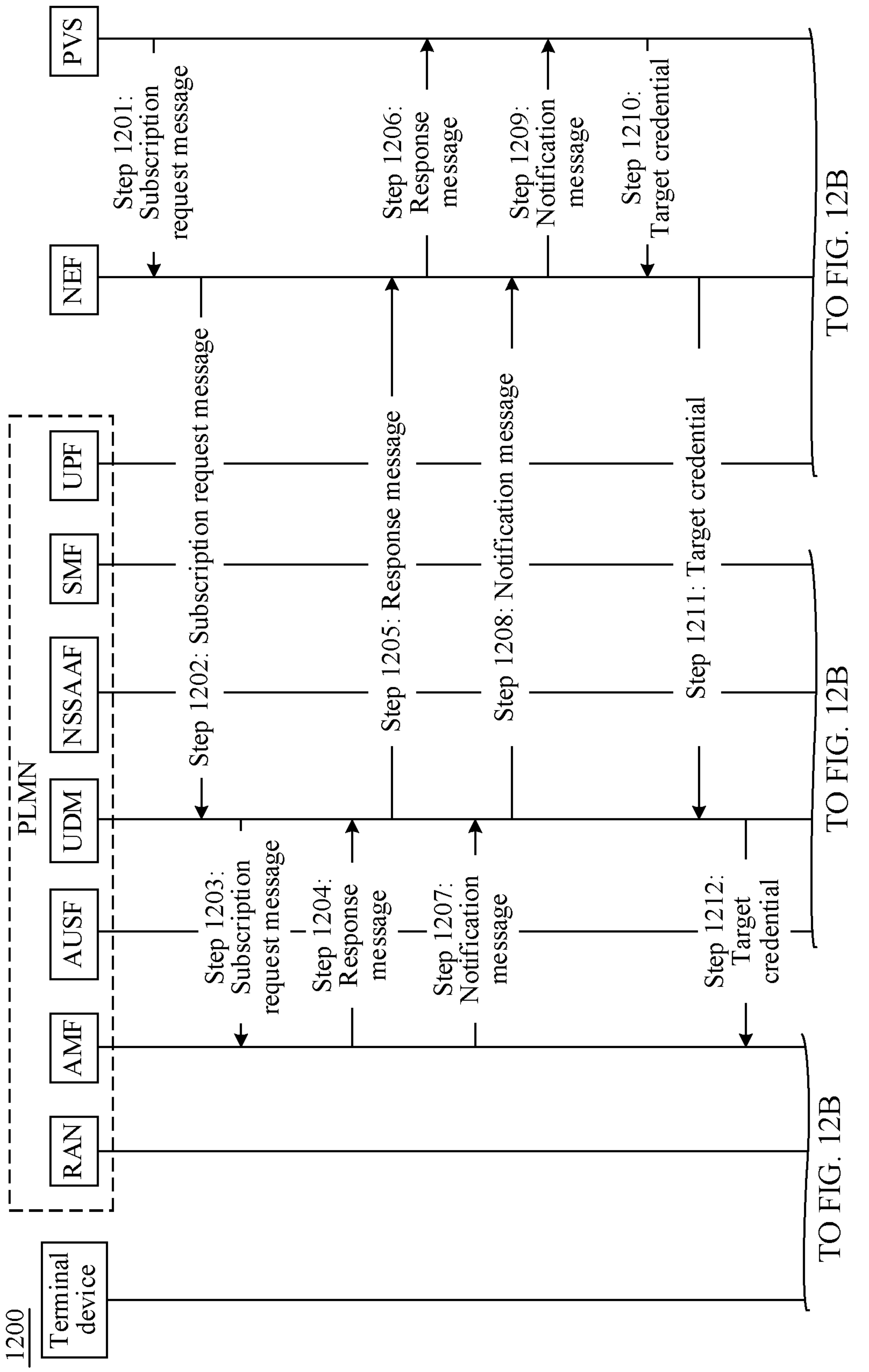
FIG. 12A and FIG. 12B are a schematic diagram of another example of a communication method according to an embodiment of this application.
Figure 12B:
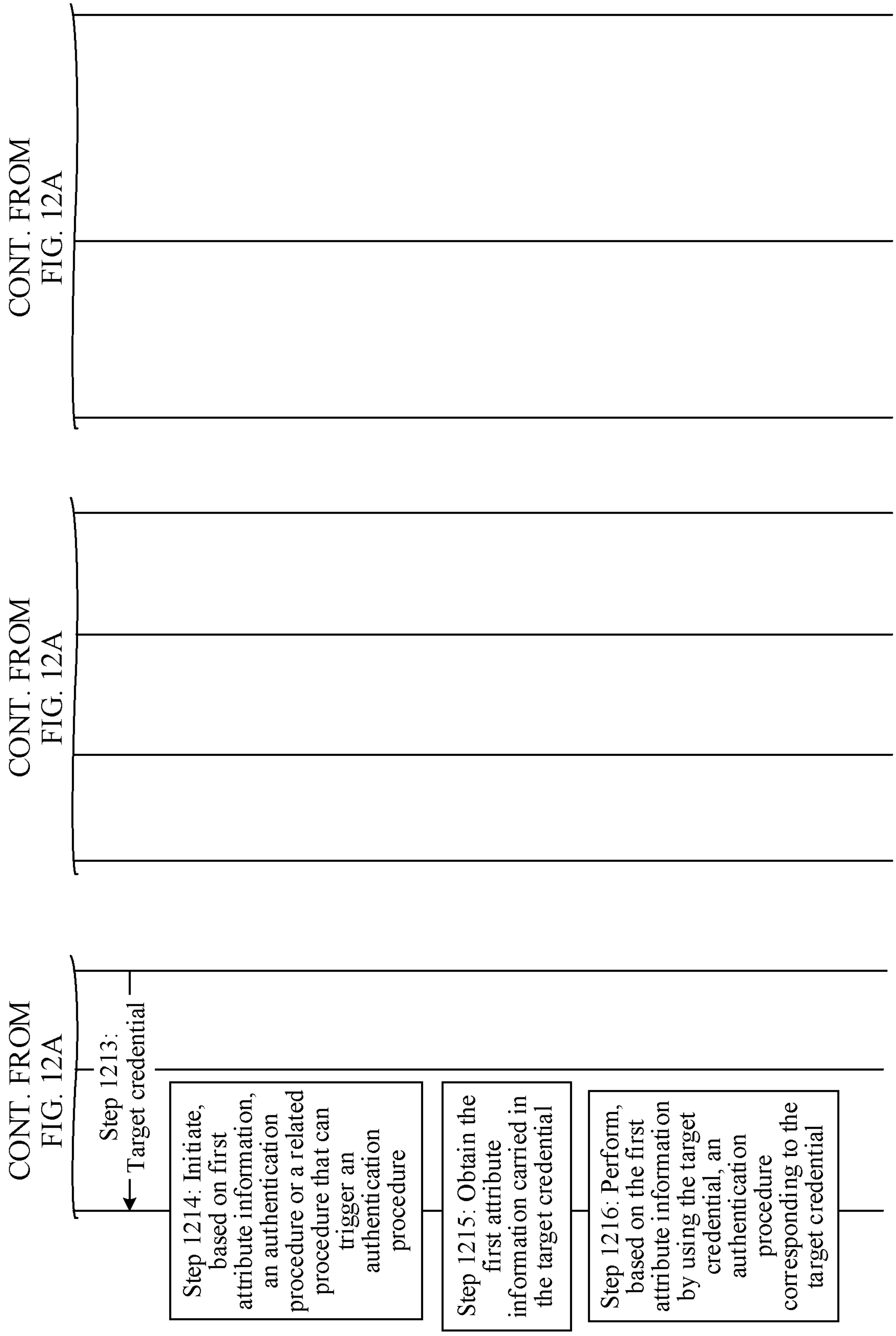

An example in which a first core network device is an AMF network element and a second core network device is a UDM network element is still used below for description with reference to a method 1200 in FIG. 12A and FIG. 12B.

Step 1201: A PVS sends a subscription request message to an NEF network element. For specific descriptions of step 1201, refer to related descriptions in step 901 in the method 900. For brevity, details are not described herein again.

Step 1202: The NEF network element sends a subscription request message to the UDM network element. For specific descriptions of step 1202, refer to related descriptions in step 902 in the method 900. For brevity, details are not described herein again.

Step 1203: The UDM network element sends a subscription request message to the AMF network element. For specific descriptions of step 1203, refer to related descriptions in step 903 in the method 900. For brevity, details are not described herein again.

Step 1204: The AMF network element sends a response message to the UDM network element. For specific descriptions of step 1204, refer to related descriptions in step 904 in the method 900. For brevity, details are not described herein again.

Step 1205: The UDM network element sends a response message to the NEF network element. For specific descriptions of step 1205, refer to related descriptions in step 905 in the method 900. For brevity, details are not described herein again.

Step 1206: The NEF network element sends a response message to the PVS. For specific descriptions of step 1206, refer to related descriptions in step 906 in the method 900. For brevity, details are not described herein again.

Step 1207: When a current location of a terminal device or a registration status of the terminal device changes, the AMF network element sends a notification message to the UDM network element. For specific descriptions of step 1207, refer to related descriptions in step 907 in the method 900. For brevity, details are not described herein again.

Step 1208: The UDM network element sends a notification message to the NEF network element. For specific descriptions of step 1208, refer to related descriptions in step 908 in the method 900. For brevity, details are not described herein again.

Step 1209: The NEF network element sends a notification message to the PVS. For specific descriptions of step 1209, refer to related descriptions in step 909 in the method 900. For brevity, details are not described herein again.

Step 1210: When registration state information of the terminal device or location information of the terminal device meets a preset condition, after the terminal device registers with a PLMN, the PVS sends a target credential to the NEF network element. It should be noted that a moment at which the terminal device registers with the PLMN is not limited in this application. In other words, the terminal device may register with the PLMN at any moment after the terminal device expects to obtain an NPN service. Before the terminal device completes PLMN registration, the target credential is temporarily buffered. After the terminal device completes PLMN registration, the target credential is sent to the terminal device. For specific descriptions of step 1210, refer to related descriptions in step 910 in the method 900. For brevity, details are not described herein again.

Step 1211: The NEF network element sends the target credential to the UDM network element. For specific descriptions of step 1211, refer to related descriptions in step 911 in the method 900. For brevity, details are not described herein again.

Step 1212: The UDM network element sends the target credential to the AMF network element.

For example, the UDM network element sends an Nudm_SDM_Notification message to the AMF network element, where the message may include the target credential and a SUPI.

It should be noted that the UDM network element may further generate second attribute information based on first attribute information carried in the target credential, and send the target credential and attribute information of the target credential to the terminal device. The attribute information of the target credential includes at least one of the first attribute information and the second attribute information.

For example, the UDM network element sends an Nudm_SDM_Notification message to the AMF network element, where the Nudm_SDM_Notification message may include the target credential, the attribute information of the target credential, and the SUPI.

Step 1213: The AMF network element sends the target credential to the terminal device.

After receiving the target credential from the UDM, the AMF network element may determine a type of the target credential based on the first attribute information carried in the target credential, and then determine, based on the type of the target credential, an authentication procedure corresponding to the target credential. In this case, the AMF network element may send the target credential to the terminal device.

It should be noted that, in addition to sending the target credential to the terminal device, the AMF network element may further send the attribute information, of the target credential, including the first attribute information to the terminal device. In addition, the AMF network element may further generate the second attribute information based on the first attribute information, and send the target credential and the attribute information of the target credential to the terminal device. The attribute information of the target credential includes at least one of the first attribute information and the second attribute information.

Step 1214: The AMF network element initiates, based on the first attribute information, an authentication procedure or a related procedure that can trigger an authentication procedure. For specific descriptions of step 1214, refer to related descriptions in step 303 in the method 300. For brevity, details are not described herein again.

Step 1215: The terminal device obtains the first attribute information carried in the target credential.

It should be noted that in step 1215, in addition to obtaining the first attribute information from the target credential, the terminal device may further obtain the attribute information of the target credential in any one of the manner 1 to the manner 3 in step 304 in the method 300. The attribute information of the target credential includes at least one of the first attribute information and the second attribute information. This is not limited in this application.

Step 1216: The terminal device performs, based on the first attribute information by using the target credential, the authentication procedure corresponding to the target credential.

After receiving the target credential from the AMF network element, the terminal device may determine, based on the first attribute information carried in the target credential, at least one of the type of the target credential and the authentication procedure corresponding to the target credential, determine, based on at least one of the type of the target credential and the authentication procedure corresponding to the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 1200, the PVS obtains status information of the terminal device, and the PVS forwards, to the terminal device through the UDM network element and the AMF network element sequentially, the target credential that carries the first attribute information only when the status information of the terminal device meets the preset condition, to optimize a mechanism in which the service provision server delivers the target credential and the attribute information of the target credential.

In addition, after receiving the target credential and the first attribute information from the PVS, the UDM network element forwards the target credential and the first attribute information to the AMF network element. The AMF network element determines the type of the target credential based on the first attribute information, and then determines the authentication procedure corresponding to the target credential. In this case, the AMF network element may send only the target credential to the terminal device, and initiate the authentication procedure or the related procedure that can trigger the authentication procedure. When the terminal device senses the authentication procedure or the related procedure that can trigger the authentication procedure, the terminal device may learn of the authentication procedure corresponding to the received target credential, and finally perform, by using the target credential, the authentication procedure corresponding to the target credential.

For example, the AMF network element initiates a deregistration procedure that can trigger a slice authentication procedure. After sensing the deregistration procedure, the terminal device may learn that the type of the recently received target credential is a credential used to perform slice authentication, so that the terminal device may perform the slice authentication procedure by using the target credential in a process of performing a registration procedure.

Figure 13:
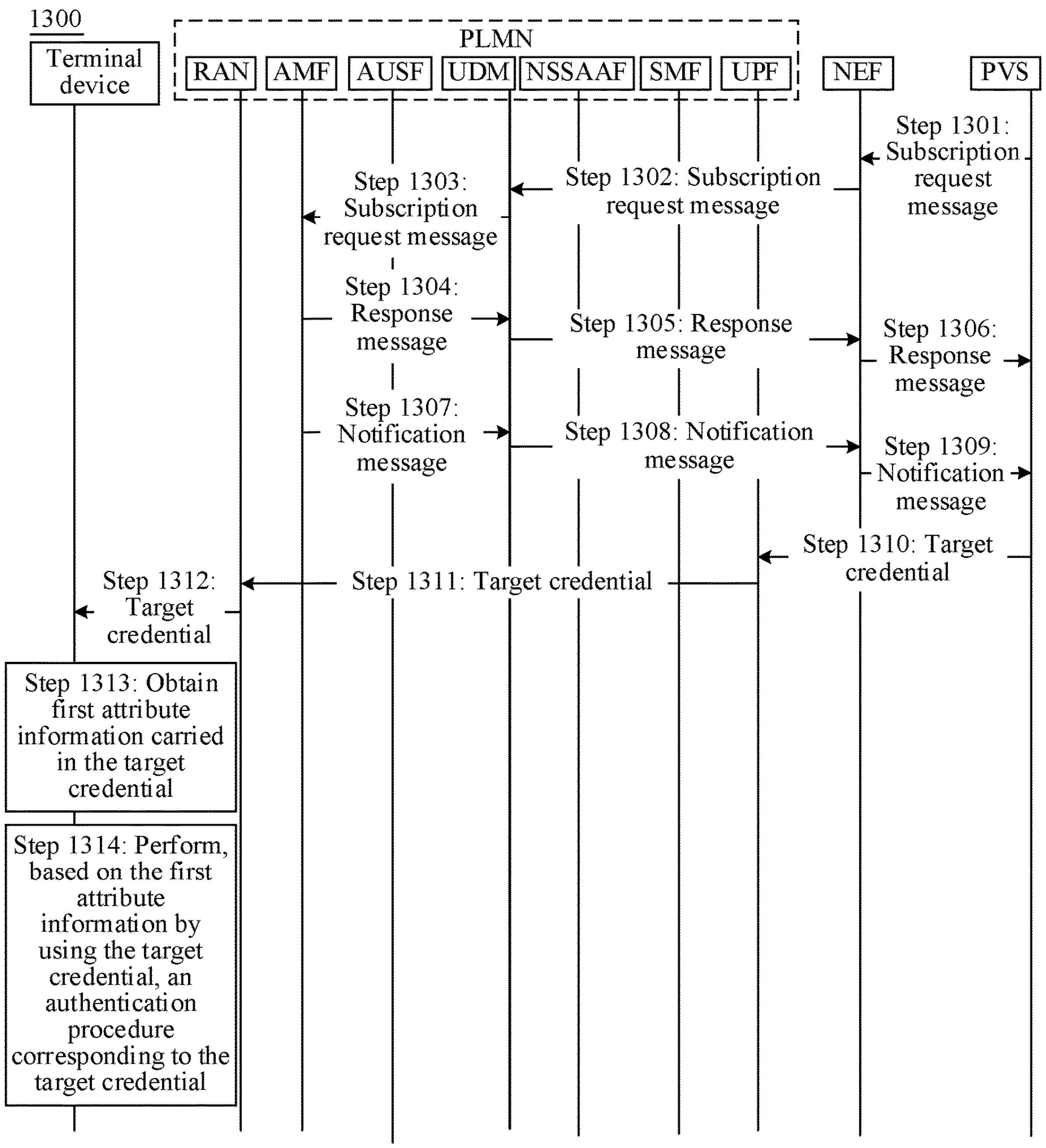
FIG. 13 is a schematic diagram of another example of a communication method according to an embodiment of this application.

An example in which a first core network device is a UPF network element is used below for description with reference to a method 1300 in FIG. 13.

Step 1301: A PVS sends a subscription request message to an NEF network element. For specific descriptions of step 1301, refer to related descriptions in step 901 in the method 900. For brevity, details are not described herein again.

Step 1302: The NEF network element sends a subscription request message to a UDM network element. For specific descriptions of step 1302, refer to related descriptions in step 902 in the method 900. For brevity, details are not described herein again.

Step 1303: The UDM network element sends a subscription request message to an AMF network element. For specific descriptions of step 1303, refer to related descriptions in step 903 in the method 900. For brevity, details are not described herein again.

Step 1304: The AMF network element sends a response message to the UDM network element. For specific descriptions of step 1304, refer to related descriptions in step 904 in the method 900. For brevity, details are not described herein again.

Step 1305: The UDM network element sends a response message to the NEF network element. For specific descriptions of step 1305, refer to related descriptions in step 905 in the method 900. For brevity, details are not described herein again.

Step 1306: The NEF network element sends a response message to the PVS. For specific descriptions of step 1306, refer to related descriptions in step 906 in the method 900. For brevity, details are not described herein again.

Step 1307: When a current location of a terminal device or a registration status of the terminal device changes, the AMF network element sends a notification message to the UDM network element. For specific descriptions of step 1307, refer to related descriptions in step 907 in the method 900. For brevity, details are not described herein again.

Step 1308: The UDM network element sends a notification message to the NEF network element. For specific descriptions of step 1308, refer to related descriptions in step 908 in the method 900. For brevity, details are not described herein again.

Step 1309: The NEF network element sends a notification message to the PVS. For specific descriptions of step 1309, refer to related descriptions in step 909 in the method 900. For brevity, details are not described herein again.

Step 1310: When registration state information of the terminal device or location information of the terminal device meets a preset condition, the PVS sends a target credential to the UPF network element. It should be noted that this application does not limit a moment at which the terminal device registers with a PLMN, a moment at which the terminal device establishes a session, and a moment at which the terminal device establishes an IP connection to the PVS. In other words, the terminal device may register with the PLMN, establish the session, and establish the IP connection to the PVS at any moment after the terminal device expects to obtain an NPN service. Before the terminal device completes PLMN registration, establishes the session, and establishes the IP connection to the PVS, the target credential is temporarily buffered. After the terminal device completes PLMN registration, establishes the session, and establishes the IP connection to the PVS, the target credential is sent to the terminal device. For specific descriptions of step 1110, refer to related descriptions in step 910 in the method 900. For brevity, details are not described herein again.

For example, the PVS sends user plane data to the UPF network element, where the user plane data includes the target credential.

Step 1311: The UPF network element sends the target credential to a RAN network element.

For example, the UPF network element sends the user plane data to the RAN network element, where the user plane data includes the target credential.

Step 1312: The RAN network element sends the target credential and attribute information of the target credential to the terminal device.

Step 1313: The terminal device obtains first attribute information.

After receiving the target credential, the terminal device may obtain the first attribute information carried in the target credential.

Step 1314: The terminal device performs, based on the first attribute information by using the target credential, an authentication procedure corresponding to the target credential.

The terminal device may determine a type of the target credential based on the first attribute information, determine, based on the type of the target credential, the authentication procedure corresponding to the target credential, and further perform, by using the target credential, the authentication procedure corresponding to the target credential. For specific descriptions of performing, by the terminal device by using the target credential, the authentication procedure corresponding to the target credential, refer to related descriptions in step 305 in the method 300. For brevity, details are not described herein again.

Based on the technical solution in the method 130*o*, the PVS obtains status information of the terminal device, and the PVS forwards, to the terminal device through the UDM network element and the AMF network element sequentially, the target credential that carries the first attribute information only when the status information of the terminal device meets the preset condition, to optimize a mechanism in which the service provision server delivers the target credential and the attribute information of the target credential.

In addition, after obtaining the target credential and the first attribute information, the PVS forwards the target credential and the first attribute information to the terminal device through the UPF network element and the RAN sequentially. The terminal device determines the type of the target credential based on the first attribute information, determines the authentication procedure corresponding to the target credential, and finally performs, by using the target credential, the authentication procedure corresponding to the target credential. It should be noted that, as mentioned in the method 900 to the method 130*o*, the premise that the PVS delivers the target credential that carries the first attribute information only when the status information of the terminal device meets the preset condition is also applicable to the method 400 to the method 800. In other words, in the method 400 to the method 800, the PVS may alternatively deliver the obtained target credential and the obtained attribute information of the target credential only when the status information of the terminal device meets the preset condition.

In this application, after sending the target credential, the PVS may further send indication information to a receiver network element of the target credential. The indication information may indicate the terminal device to initiate the registration procedure or the session management procedure. The receiver network element of the target credential forwards the indication information and the target credential to the terminal device, so that the terminal device learns of, based on the indication information, the type of the target credential from the PVS, initiates the registration procedure or the session management procedure indicated by the indication information, and performs the slice authentication procedure or the secondary authentication procedure by using the target credential in the process of performing the registration procedure or the session management procedure.

For example, if the indication information indicates the terminal device to initiate the registration procedure, the terminal device may learn that the type of the target credential from the PVS is the credential used to perform the slice authentication procedure. Then, the terminal device initiates the registration procedure, and performs the slice authentication procedure by using the target credential from the PVS in the process of performing the registration procedure.

For example, if the indication information indicates the terminal device to initiate the session management procedure, the terminal device may learn that the type of the target credential from the PVS is the credential used to perform the secondary authentication procedure. Then, the terminal device initiates the session management procedure, and performs the secondary authentication procedure by using the target credential from the PVS in the process of performing the session management procedure.

It should be noted that, in this application, the PVS may be trusted, or may be untrusted. If the PVS is trusted, the PVS may directly send a message to the UDM network element. If the PVS is untrusted, the PVS needs to first send a message to the NEF network element, and then the NEF network element forwards the message to the UDM network element.

It should be noted that the foregoing communication methods provided in this application are merely used as examples for description, and do not constitute a limitation on this application. Any method obtained by replacing or recombining the foregoing steps falls within the protection scope of this application.

The communication methods provided in embodiments of this application are described in detail above with reference to FIG. 3 to FIG. 13. Communication apparatuses provided in embodiments of this application are described in detail below with reference to FIG. 14 and FIG. 15.

Figure 14:
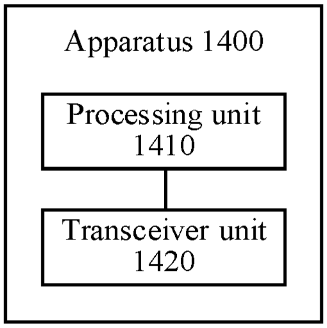
FIG. 14 is a schematic block diagram of a communication apparatus according to an embodiment of this application.

FIG. 14 is a schematic block diagram of a communication apparatus according to an embodiment of this application. As shown in FIG. 14, the apparatus 1400 may include a processing unit 1410 and a transceiver unit 1420.

In a possible design, the apparatus 1400 may be the first core network device in the foregoing method embodiments, or may be a module (for example, a chip) used in the first core network device. The apparatus 1400 may be configured to perform steps or procedures corresponding to the UPF network element, the AMF network element, or the UPF network element in the method 200 to the method 1300.

Specifically, the processing unit 1410 is configured to obtain a target credential and attribute information of the target credential.

The transceiver unit 1420 is configured to send the target credential to a terminal device.

The processing unit 1410 is further configured to trigger, based on the attribute information of the target credential, the terminal device to perform a corresponding authentication procedure by using the target credential (that is, perform, by using the target credential, the authentication procedure corresponding to the target credential).

Optionally, the attribute information of the target credential includes at least one of first attribute information and second attribute information, the first attribute information indicates a type of the target credential, and the second attribute information indicates the authentication procedure corresponding to the target credential.

Optionally, the processing unit 1410 is specifically configured to obtain the target credential from a service provision server or a second core network device.

Optionally, the attribute information of the target credential includes the first attribute information, the first attribute information indicates the type of the target credential, and the processing unit 1410 is specifically configured to obtain the first attribute information from the service provision server or the second core network device.

Optionally, the attribute information of the target credential includes the second attribute information, the second attribute information indicates the authentication procedure corresponding to the target credential, and the processing unit 1410 is specifically configured to: obtain the second attribute information from the second core network device, where the second attribute information is generated by the second core network device based on the first attribute information after the second core network device obtains the first attribute information; or after obtaining the first attribute information, generate the second attribute information based on the first attribute information.

Optionally, the first core network device is based on the attribute information of the target credential. The processing unit 1410 is specifically configured to send the attribute information corresponding to the target credential to the terminal device, so that the terminal device performs the corresponding authentication procedure by using the target credential based on the attribute information corresponding to the target credential (that is, performs, by using the target credential, the authentication procedure corresponding to the target credential).

Optionally, the attribute information of the target credential includes at least one of the first attribute information and the second attribute information, the first attribute information indicates that the type of the target credential is a credential used to perform a slice authentication procedure, the second attribute information indicates that the authentication procedure corresponding to the target credential is the slice authentication procedure, and the processing unit 1410 is specifically configured to trigger a deregistration procedure, so that the terminal device performs the slice authentication procedure by using the target credential after the deregistration procedure is completed.

Optionally, the attribute information of the target credential includes at least one of the first attribute information and the second attribute information, the first attribute information indicates that the type of the target credential is a credential used to perform a secondary authentication procedure, the second attribute information indicates that the authentication procedure corresponding to the target credential is the secondary authentication procedure, and the processing unit 1410 is specifically configured to trigger a session management procedure, so that the terminal device performs the secondary authentication procedure by using the target credential in a process of performing the session management procedure.

Optionally, the session management procedure is a session establishment procedure or a session modification procedure.

Optionally, the first core network device is one of a unified data management UDM network element and a mobility management function AMF network element.

Optionally, the second core network device is one of the UDM network element and the AMF network element, and when the first core network device is the AMF network element, the second core network device is the UDM network element.

In another possible design, the apparatus 1400 may be the terminal device in the foregoing method embodiments, or may be a module (for example, a chip) used in the terminal device. The apparatus 1400 may be configured to perform steps or procedures corresponding to the terminal device in the method 200 to the method 1300.

Specifically, the transceiver unit 1420 is configured to receive a target credential sent by a first core network device or a service provision server.

The processing unit 1410 is configured to obtain attribute information of the target credential.

The processing unit 1410 is further configured to perform a corresponding authentication procedure based on the attribute information of the target credential by using the target credential (that is, perform, by using the target credential, the authentication procedure corresponding to the target credential).

Optionally, the attribute information of the target credential includes at least one of first attribute information and second attribute information, the first attribute information indicates a type of the target credential, and the second attribute information indicates the authentication procedure corresponding to the target credential.

Optionally, the attribute information of the target credential includes at least one of the first attribute information and the second attribute information, the first attribute information indicates that the type of the target credential is a credential used to perform a slice authentication procedure, the second attribute information indicates that the authentication procedure corresponding to the target credential is the slice authentication procedure, and the processing unit 1410 is specifically configured to: perform a registration procedure based on the attribute information of the target credential, and perform the slice authentication procedure by using the target credential in a process of performing the registration procedure.

Optionally, the registration procedure is any one of an initial registration procedure, a mobile registration update procedure, a periodic registration update procedure, and an emergency registration procedure.

Optionally, the attribute information of the target credential includes at least one of the first attribute information and the second attribute information, the first attribute information indicates that the type of the target credential is a credential used to perform a secondary authentication procedure, the second attribute information indicates that the authentication procedure corresponding to the target credential is the secondary authentication procedure, and the processing unit 1410 is specifically configured to: perform a session management procedure based on the attribute information of the target credential, and perform the secondary authentication procedure by using the target credential in a process of performing the session management procedure.

Optionally, the session management procedure is a session establishment procedure or a session modification procedure.

In still another possible design, the apparatus 1400 may be the PVS in the foregoing method embodiments, or may be a module (for example, a chip) used in the PVS. The apparatus 1400 may be configured to perform steps or procedures corresponding to the PVS in the method 200 to the method 1300.

Specifically, the processing unit 1410 is configured to obtain a target credential and attribute information of the target credential.

The transceiver unit 1420 is configured to send the target credential and the attribute information of the target credential to a first core network device.

Optionally, the attribute information of the target credential includes at least one of first attribute information and second attribute information, the first attribute information indicates a type of the target credential, and the second attribute information indicates the authentication procedure corresponding to the target credential.

Optionally, the processing unit 1410 is further configured to obtain status information of a terminal device.

The transceiver unit 1420 is specifically configured to: when the status information of the terminal device meets a preset condition, send the target credential and the attribute information of the target credential to the first core network device.

Optionally, the status information includes registration state information or location information.

Optionally, the preset condition is: the registration state information of the terminal device indicates that the terminal device is in a registered state; or the location information of the terminal device indicates that the terminal device is located in a target tracking area or a target cell, where the target tracking area is a tracking area in which a non-public network service can be provided, and the target cell is a cell in which the non-public network service can be provided.

Optionally, the target credential is a credential used to perform a slice authentication procedure or a credential used to perform a secondary authentication procedure.

In still another possible design, the apparatus 1400 may be the PVS in the foregoing method embodiments, or may be a module (for example, a chip) used in the PVS. The apparatus 1400 may be configured to perform steps or procedures corresponding to the PVS in the method 200 to the method 1300.

Specifically, the processing unit 1410 is configured to obtain a target credential.

The transceiver unit 1420 is configured to send the target credential to a terminal device, so that after obtaining attribute information of the target credential, the terminal device performs a corresponding authentication procedure by using the target credential (that is, performs, by using the target credential, the authentication procedure corresponding to the target credential).

In an implementation, the target credential may be modified, so that a modified target credential carries first attribute information, where the first attribute information indicates a type of the target credential.

Optionally, the attribute information of the target credential includes at least one of first attribute information and second attribute information, the first attribute information indicates a type of the target credential, and the second attribute information indicates the authentication procedure corresponding to the target credential.

Optionally, the transceiver unit 1420 is further configured to send the attribute information of the target credential to the terminal device.

Optionally, the processing unit 1410 is further configured to obtain status information of the terminal device.

The transceiver unit 1420 is specifically configured to: when the status information of the terminal device meets a preset condition, send the target credential to the terminal device.

Optionally, the status information includes registration state information or location information.

Optionally, the preset condition is: the registration state information of the terminal device indicates that the terminal device is in a registered state; or the location information of the terminal device indicates that the terminal device is located in a target tracking area or a target cell, where the target tracking area is a tracking area in which a non-public network service can be provided, and the target cell is a cell in which the non-public network service can be provided.

Optionally, the target credential is a credential used to perform a slice authentication procedure or a credential used to perform a secondary authentication procedure.

It should be understood that the apparatus 1400 herein is embodied in a form of a functional unit. The term “unit” herein may refer to an application specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1400 may be specifically the first core network device in the foregoing embodiments, and may be configured to perform procedures and/or steps corresponding to the first core network device in the foregoing method embodiments. Alternatively, the apparatus 1400 may be specifically the terminal device in the foregoing embodiments, and may be configured to perform procedures and/or steps corresponding to the terminal device in the foregoing method embodiments. Alternatively, the apparatus 1400 may be specifically the PVS in the foregoing embodiments, and may be configured to perform procedures and/or steps corresponding to the PVS in the foregoing method embodiments. Details are not described herein again.

The apparatus 1400 in the foregoing solutions has a function of implementing corresponding steps performed by the first core network device in the foregoing methods, the apparatus 1400 in the foregoing solutions has a function of implementing corresponding steps performed by the terminal device in the foregoing methods, or the apparatus 1400 in the foregoing solutions has a function of implementing corresponding steps performed by the PVS in the foregoing methods. The function may be implemented by hardware, or may be implemented by hardware executing corresponding software. The hardware or software includes one or more modules corresponding to the foregoing function. For example, a communication unit may be replaced with a transceiver (for example, a sending unit in the communication unit may be replaced with a transmitter, and a receiving unit in the communication unit may be replaced with a receiver), and another unit such as a processing unit may be replaced with a processor, to respectively perform sending/receiving operations and processing-related operations in the method embodiments.

In addition, the communication unit may alternatively be a transceiver circuit (which may include, for example, a receiving circuit and a transmitting circuit), and the processing unit may be a processing circuit.

Figure 15:
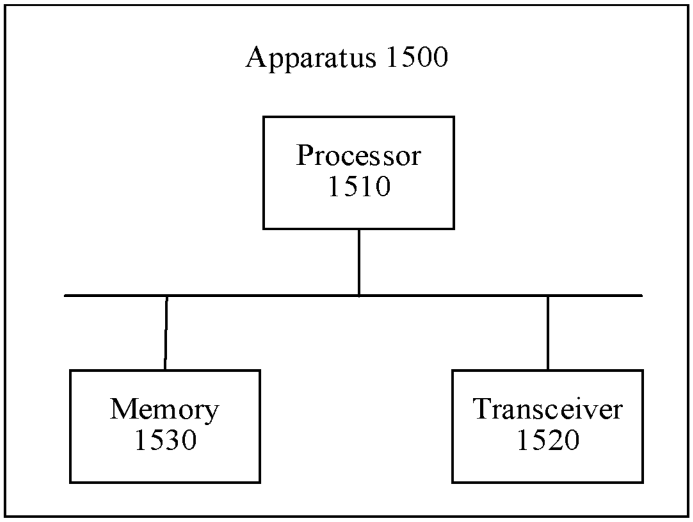
FIG. 15 is another schematic block diagram of a communication apparatus according to an embodiment of this application.

FIG. 15 shows a communication apparatus 1500 according to an embodiment of this application. The apparatus 1500 includes a processor 1510 and a transceiver 1520. The processor 1510 and the transceiver 1520 communicate with each other through an internal connection path. The processor 1510 is configured to execute instructions, to control the transceiver 1520 to send a signal and/or receive a signal.

Optionally, the apparatus 1500 may further include a memory 1530. The memory 1530 communicates with the processor 1510 and the transceiver 1520 through an internal connection path. The memory 1530 is configured to store instructions, and the processor 1510 may execute the instructions stored in the memory 1530. In a possible implementation, the apparatus 1500 is configured to implement procedures and steps corresponding to the first core network device in the foregoing method embodiments. In another possible implementation, the apparatus 1500 is configured to implement procedures and steps corresponding to the terminal device in the foregoing method embodiments. In still another possible implementation, the apparatus 1500 is configured to implement procedures and steps corresponding to the PVS in the foregoing method embodiments.

It should be understood that the apparatus 1500 may be specifically the first core network device, the terminal device, or the PVS in the foregoing embodiments, or may be a chip or a chip system. Correspondingly, the transceiver 1520 may be a transceiver circuit of the chip. This is not limited herein. Specifically, the apparatus 1500 may be configured to perform steps and/or procedures corresponding to the first core network device, the terminal device, or the PVS in the foregoing method embodiments. Optionally, the memory 1530 may include a read-only memory and a random access memory, and provide the instructions and data for the processor. A part of the memory may further include a non-volatile random access memory. For example, the memory may further store information of a device type. The processor 1510 may be configured to execute the instructions stored in the memory, and when the processor 1510 executes the instructions stored in the memory, the processor 1510 is configured to perform steps and/or procedures corresponding to the first core network device, the terminal device, or the PVS in the foregoing method embodiments. In an implementation process, steps in the foregoing methods may be implemented by a hardware integrated logic circuit in the processor, or by using instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments may be implemented by a hardware integrated logic circuit in the processor, or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the method disclosed with reference to embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include, but not limited to, these memories and any memory of another proper type.

According to the methods provided in embodiments of this application, this application further provides a computer program product. The computer program product includes computer program code. When the computer program code is run on a computer, the computer is enabled to perform steps or procedures performed by the first core network device, the terminal device, or the PVS in the embodiments shown in FIG. 3 to FIG. 13.

According to the methods provided in embodiments of this application, this application further provides a computer-readable storage medium. The computer-readable storage medium stores program code. When the program code is run on a computer, the computer is enabled to perform steps or procedures performed by the first core network device, the terminal device, or the PVS in the embodiments shown in FIG. 3 to FIG. 13.

According to the methods provided in embodiments of this application, this application further provides a communication system. The communication system may include a terminal device, a PVS, and the network elements in the embodiments shown in FIG. 3 to FIG. 13.

The foregoing apparatus embodiments completely correspond to the embodiments shown in FIG. 3 to FIG. 13 in the method embodiments, and corresponding modules or units perform corresponding steps. For example, the communication unit (transceiver) performs a receiving or sending step in the method embodiments, and the processing unit (processor) may perform other steps than sending and receiving steps. A function of a specific unit may be based on a corresponding method embodiment. There may be one or more processors.

In embodiments of this application, the terms and English abbreviations are all examples given for ease of description, and should not constitute any limitation on this application. This application does not exclude a possibility of defining another term that can implement a same or similar function in an existing or future protocol.

In embodiments of this application, "first", "second", and various numerical numbers are merely used for distinguishing for ease of description, and are not used to limit the scope of embodiments of this application. For example, different core network devices are distinguished between, and different attribute information is distinguished between.

Terms such as "component", "module", and "system" used in this specification are used to indicate computer-related entities, hardware, firmware, combinations of hardware and software, software, or software being executed.

For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable storage media storing various data structures. For example, the components may perform communication by using a local process and/or a remote process and based on, for example, a signal having one or more data packets (for example, data from two components interacting with another component in a local system, a distributed system, and/or across a network such as the internet interacting with another system by using the signal).

It should be understood that, in this specification, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, and c may indicate: a, b, c, a and b, a and c, b and c, or a, b, and c, where a, b, and c may be singular or plural.

A person of ordinary skill in the art may be aware that, in combination with illustrative logical blocks (illustrative logical blocks) described in embodiments disclosed in this specification and steps (steps), this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining, by a first core network device, a target credential and attribute information of the target credential, wherein the attribute information of the target credential comprises first attribute information, the first attribute information indicates a type of the target credential, and the obtaining the attribute information of the target credential comprises:

obtaining, by the first core network device, the first attribute information from a service provision server or a second core network device;

sending, by the first core network device, the target credential to a terminal device; and triggering, by the first core network device based on the attribute information of the target credential, the terminal device to perform a corresponding authentication procedure by using the target credential.

2. The method according to claim 1, wherein the attribute information of the target credential further comprises second attribute information, the second attribute information indicates the corresponding authentication procedure corresponding to the target credential, and the obtaining, by the first core network device, the attribute information of the target credential comprises:

obtaining, by the first core network device, the second attribute information from the second core network device, wherein the second attribute information is generated by the second core network device based on the first attribute information after the second core network device obtains the first attribute information; or after obtaining the first attribute information, generating, by the first core network device, the second attribute information based on first attribute information.

3. The method according to claim 1, wherein the triggering, by the first core network device based on the attribute information of the target credential, the terminal device to perform the corresponding authentication procedure by using the target credential comprises:

sending, by the first core network device, the attribute information corresponding to the target credential to the terminal device, so that the terminal device performs the corresponding authentication procedure by using the target credential based on the attribute information corresponding to the target credential.

4. The method according to claim 1, wherein the attribute information of the target credential further comprises second attribute information, the first attribute information indicates that the type of the target credential is a credential used to perform a slice authentication procedure, the second attribute information indicates that the corresponding authentication procedure corresponding to the target credential is the slice authentication procedure, and the triggering, by the first core network device based on the attribute information of the target credential, the terminal device to perform the corresponding authentication procedure by using the target credential comprises:

triggering, by the first core network device, a deregistration procedure, so that the terminal device performs the slice authentication procedure by using the target credential after the deregistration procedure is completed.

5. The method according to claim 1, wherein the attribute information of the target credential further comprises second attribute information, the first attribute information indicates that the type of the target credential is a credential used to perform a secondary authentication procedure, the second attribute information indicates that the corresponding authentication procedure corresponding to the target credential is the secondary authentication procedure, and the triggering, by the first core network device based on the attribute information of the target credential, the terminal device to perform the corresponding authentication procedure by using the target credential comprises:

triggering, by the first core network device, a session management procedure, so that the terminal device performs the secondary authentication procedure by using the target credential in a process of performing the session management procedure.

6. The method according to claim 5, wherein the session management procedure is a session establishment procedure or a session modification procedure.

7. The method according to claim 1, wherein the first core network device is one of a unified data management (UDM) network element and a mobility management function (AMF) network element, the second core network device is one of the UDM network element or the AMF network element, and, when the first core network device is the AMF network element, the second core network device is the UDM network element.

8. The method according to claim 1, wherein the first attribute information includes one bit, a first value of the one bit indicates a slice authentication procedure credential type, and a second value of the one bit indicates a secondary authentication procedure credential type.

9. The method according to claim 1, wherein the first core network device and the service provision server are two different devices.

10. A method, comprising:

receiving, by a terminal device, a target credential sent by a first core network device or a service provision server;

obtaining, by the terminal device, attribute information of the target credential, wherein the attribute information of the target credential comprises first attribute information, and the first attribute information indicates a type of the target credential; and performing, by the terminal device, a corresponding authentication procedure based on the attribute information of the target credential by using the target credential.

11. The method according to claim 10, wherein the attribute information of the target credential further comprises second attribute information, and the second attribute information indicates the corresponding authentication procedure corresponding to the target credential.

12. The method according to claim 10, wherein the attribute information of the target credential further comprises second attribute information, the first attribute information indicates that the type of the target credential is a credential used to perform a slice authentication procedure, the second attribute information indicates that the corresponding authentication procedure corresponding to the target credential is the slice authentication procedure, and the performing, by the terminal device, the corresponding authentication procedure based on the attribute information of the target credential by using the target credential comprises:

performing, by the terminal device, a registration procedure based on the attribute information of the target credential; and performing the slice authentication procedure by using the target credential in a process of performing the registration procedure.

13. The method according to claim 12, wherein the registration procedure is any one of an initial registration procedure, a mobile registration update procedure, a periodic registration update procedure, or an emergency registration procedure.

14. The method according to claim 10, wherein the attribute information of the target credential further comprises second attribute information, the first attribute information indicates that the type of the target credential is a credential used to perform a secondary authentication procedure, the second attribute information indicates that the corresponding authentication procedure corresponding to the target credential is the secondary authentication procedure, and the performing, by the terminal device, the corresponding authentication procedure based on the attribute information of the target credential by using the target credential comprises:

performing, by the terminal device, a session management procedure based on the attribute information of the target credential; and performing the secondary authentication procedure by using the target credential in a process of performing the session management procedure.

15. The method according to claim 14, wherein the session management procedure is a session establishment procedure or a session modification procedure.

16. An apparatus, comprising:

at least one processor; and at least one non-transitory memory storing programming, the programming including instructions that, when executed by the at least one processor, enables the apparatus to perform operations including:

obtaining a target credential and attribute information of the target credential, wherein the attribute information of the target credential comprises first attribute information, the first attribute information indicates a type of the target credential, and the obtaining the attribute information of the target credential comprises:

obtaining the first attribute information from a service provision server or a second core network device;

sending the target credential to a terminal device; and triggering based on the attribute information of the target credential, the terminal device to perform a corresponding authentication procedure by using the target credential.

17. The apparatus according to claim 16, wherein the attribute information of the target credential further comprises second attribute information, the second attribute information indicates the corresponding authentication procedure corresponding to the target credential, and the operations further include:

obtaining the second attribute information from the second core network device, wherein the second attribute information is generated by the second core network device based on the first attribute information after the second core network device obtains the first attribute information; or after obtaining the first attribute information, generating the second attribute information based on first attribute information.

18. An apparatus, comprising:

at least one processor; and at least one non-transitory memory storing programming, the programming including instructions that, when executed by the at least one processor, enables the apparatus to perform operations including:

receiving a target credential sent by a first core network device or a service provision server;

obtaining attribute information of the target credential, wherein the attribute information of the target credential comprises first attribute information, and the first attribute information indicates a type of the target credential; and performing a corresponding authentication procedure based on the attribute information of the target credential by using the target credential.

19. The apparatus according to claim 18, wherein the attribute information of the target credential further comprises second attribute information, the first attribute information indicates that the type of the target credential is a credential used to perform a slice authentication procedure, the second attribute information indicates that the corresponding authentication procedure corresponding to the target credential is the slice authentication procedure, and the operations further include:

performing a registration procedure based on the attribute information of the target credential; and performing the slice authentication procedure by using the target credential in a process of performing the registration procedure.

20. The apparatus according to claim 18, wherein the attribute information of the target credential further comprises second attribute information, the first attribute information indicates that the type of the target credential is a credential used to perform a secondary authentication procedure, the second attribute information indicates that the corresponding authentication procedure corresponding to the target credential is the secondary authentication procedure, and the operations further include:

performing a session management procedure based on the attribute information of the target credential; and performing the secondary authentication procedure by using the target credential in a process of performing the session management procedure.

* * * * *